(12) United States Patent
Sato

(10) Patent No.: US 6,623,121 B2
(45) Date of Patent: Sep. 23, 2003

(54) POLARIZATION BEAM SPLITTER, OPTICAL DEVICE FOR PROJECTION TYPE DISPLAY DEVICE, PROJECTION TYPE DISPLAY DEVICE, AND POLARIZATION BEAM SPLITTER MANUFACTURING METHOD

(75) Inventor: Masatoshi Sato, Machida (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/032,092

(22) Filed: Dec. 31, 2001

(65) Prior Publication Data
US 2002/0089648 A1 Jul. 11, 2002

(30) Foreign Application Priority Data
Jan. 5, 2001 (JP) ........................ 2001-000720

(51) Int. Cl.[7] ........................... G03B 21/14; G02B 27/28
(52) U.S. Cl. ........................... 353/20; 359/487; 359/500
(58) Field of Search ........................... 353/20, 81, 122, 353/31.33, 34.37; 359/487, 488, 495, 496, 500, 490

(56) References Cited

U.S. PATENT DOCUMENTS

| 5,237,446 A | * | 8/1993 | Takahashi | 359/359 |
|---|---|---|---|---|
| 5,453,859 A | * | 9/1995 | Sannohe et al. | 349/9 |
| 6,190,014 B1 | | 2/2001 | Kusano et al. | |
| 6,250,762 B1 | * | 6/2001 | Kuijper | 353/20 |
| 6,432,854 B1 | * | 8/2002 | Ueda et al. | 501/74 |
| 6,486,997 B1 | * | 11/2002 | Bruzzone et al. | 359/247 |

* cited by examiner

*Primary Examiner*—William C. Dowling

(57) ABSTRACT

A polarization beam splitter comprises a first prism having a first aggregation layer formed on a predetermined surface of the first prism and reflecting S-polarized light in a first wavelength region, and a second aggregation layer so formed as to be stacked on the first aggregation layer and reflecting the S-polarized light in a second wavelength region longer than the first wavelength region, and a second prism fixed to the first prism through the first aggregation layer and the second aggregation layer.

29 Claims, 15 Drawing Sheets

FIG. 4

| NO. | MATERIAL SUBSTRATE : SF57 | THICKNESS (nm) |
|---|---|---|
| 1 | SiO2 | 67.13 |
| 2 | TiO2 | 44.21 |
| 3 | SiO2 | 134.26 |
| 4 | TiO2 | 44.21 |
| 5 | SiO2 | 134.26 |
| 6 | TiO2 | 44.21 |
| 7 | SiO2 | 134.26 |
| 8 | TiO2 | 44.21 |
| 9 | SiO2 | 134.26 |
| 10 | TiO2 | 44.21 |
| 11 | SiO2 | 134.26 |
| 12 | TiO2 | 44.21 |
| 13 | SiO2 | 134.26 |
| 14 | TiO2 | 44.21 |
| 15 | SiO2 | 134.26 |
| 16 | TiO2 | 44.21 |
| 17 | SiO2 | 134.26 |
| 18 | TiO2 | 44.21 |
| 19 | SiO2 | 67.13 |
| 20 | TiO2 | 77.37 |
| 21 | Al2O3 | 170.13 |
| 22 | TiO2 | 77.37 |
| 23 | Al2O3 | 170.13 |
| 24 | TiO2 | 77.37 |
| 25 | Al2O3 | 170.13 |
| 26 | TiO2 | 77.37 |
| 27 | Al2O3 | 170.13 |
| 28 | TiO2 | 77.37 |
| 29 | Al2O3 | 170.13 |
| 30 | TiO2 | 77.37 |
| 31 | Al2O3 | 170.13 |
| 32 | TiO2 | 77.37 |
| 33 | Al2O3 | 170.13 |
| 34 | TiO2 | 77.37 |
| 35 | Al2O3 | 170.13 |
| 36 | TiO2 | 77.37 |
| 37 | Al2O3 | 170.13 |
| 38 | TiO2 | 77.37 |

EPOXY BONDING AGENT

FIG. 13

| NO. | MATERIAL SUBSTRATE: SF57 | THICKNESS (nm) |
|---|---|---|
| 1 | SiO2 | 67.13 |
| 2 | TiO2 | 44.21 |
| 3 | SiO2 | 134.26 |
| 4 | TiO2 | 44.21 |
| 5 | SiO2 | 134.26 |
| 6 | TiO2 | 44.21 |
| 7 | SiO2 | 134.26 |
| 8 | TiO2 | 44.21 |
| 9 | SiO2 | 134.26 |
| 10 | TiO2 | 44.21 |
| 11 | SiO2 | 134.26 |
| 12 | TiO2 | 44.21 |
| 13 | SiO2 | 134.26 |
| 14 | TiO2 | 44.21 |
| 15 | SiO2 | 134.26 |
| 16 | TiO2 | 44.21 |
| 17 | SiO2 | 134.26 |
| 18 | TiO2 | 44.21 |
| 19 | SiO2 | 67.13 |
| 20 | TiO2 | 77.37 |
| 21 | Al2O3 | 170.13 |
| 22 | TiO2 | 77.37 |
| 23 | Al2O3 | 170.13 |
| 24 | TiO2 | 77.37 |
| 25 | Al2O3 | 170.13 |
| 26 | TiO2 | 77.37 |
| 27 | Al2O3 | 170.13 |
| 28 | TiO2 | 77.37 |
| 29 | Al2O3 | 170.13 |
| 30 | TiO2 | 77.37 |
| 31 | Al2O3 | 170.13 |
| 32 | TiO2 | 77.37 |
| 33 | Al2O3 | 170.13 |
| 34 | TiO2 | 77.37 |
| 35 | Al2O3 | 170.13 |
| 36 | TiO2 | 77.37 |
| 37 | Al2O3 | 170.13 |
| 38 | TiO2 | 77.37 |
| 39 | SiO2 | 67.13 |
| 40 | TiO2 | 44.21 |
| 41 | SiO2 | 134.26 |
| 42 | TiO2 | 44.21 |
| 43 | SiO2 | 134.26 |
| 44 | TiO2 | 44.21 |
| 45 | SiO2 | 134.26 |
| 46 | TiO2 | 44.21 |
| 47 | SiO2 | 134.26 |
| 48 | TiO2 | 44.21 |
| 49 | SiO2 | 134.26 |
| 50 | TiO2 | 44.21 |
| 51 | SiO2 | 134.26 |
| 52 | TiO2 | 44.21 |
| 53 | SiO2 | 134.26 |
| 54 | TiO2 | 44.21 |
| 55 | SiO2 | 134.26 |
| 56 | TiO2 | 44.21 |
| 57 | SiO2 | 67.13 |

EPOXY BONDING AGENT

POLARIZATION BEAM SPLITTER, OPTICAL DEVICE FOR PROJECTION TYPE DISPLAY DEVICE, PROJECTION TYPE DISPLAY DEVICE, AND POLARIZATION BEAM SPLITTER MANUFACTURING METHOD

This application claims the benefit of Japanese Patent application No. 2000-000720 which is hereby incorporated by reference.

BACKGROUND OF THE INVENTION

1. Field of the Invention

The present invention relates to a polarization beam splitter used for polarization-splitting into an S-polarized light component and a P-polarized light component and synthesizing these light components, an optical device for a projection type display device including this beam splitter, a projection type display device, and a polarization beam splitter manufacturing method.

2. Related Background Art

A polarization beam splitter that is generally used is provided with dielectric substance multi-layered film in which a dielectric substance layer composed of a high refractive index substance and a dielectric substance layer composed of a low refractive index substance are so multi-layered as to be alternately stacked between two pieces of rectangular prisms. It is, however, difficult for the single dielectric substance multi-layered film to polarization-split and synthesize the light in a broad wavelength band. This being the case, a 2-tiered dielectric substance multi-layer film including a first tier for reflecting the light having a long wavelength and a second tier for reflecting the light having a short wavelength, is used in many cases. The thus constructed polarization beam splitter is disclosed in, e.g., Japanese Patent Application Laid-Open No. 7-281024.

FIG. 15 is a diagram showing a configuration of the conventional polarization beam splitter disclosed in Japanese Patent Application Laid-Open No. 7-281024. A tier 3 for reflecting the light in a long wavelength (680 nm) region and a tier 4 for reflecting the light in a short wavelength (420 nm) region, are provided between two pieces of rectangular prisms 1, 2. Then, the two prisms 1, 2 are bonded by an optical bonding agent 5 through the tiers 3, 4.

A complex refractive index of the substance composing the dielectric substance multi-layered film may be expressed by n–ik, where n is a refractive index, and k is an attenuation coefficient. The refractive index n and the attenuation coefficient k have dispersions. Namely, the refractive index n and the attenuation coefficient k change depending on a wavelength λ. Hence, the refractive index n and the attenuation coefficient k increase as the wavelength λ decreases. Accordingly, the absorption by the dielectric substance multi-layered film becomes large in the short wavelength region. Therefore, this results in a large exothermic quantity due to the absorption. When the exothermic quantity increases, a glass constituting the prism is distorted due to a thermal stress, and a polarized state of the polarization beam splitter is disordered. As a result, there arises a problem of causing a decline of contrast of a projected image in the projection type display device using the polarization beam splitter.

SUMMARY OF THE INVENTION

It is a primary object of the present invention, which was devised to obviate the problems described above, to provide a polarization beam splitter having a high polarized light splitting ratio and a broad bandwidth of the wavelength to be used, a manufacturing method thereof, an optical device for a projection type display device capable of obtaining a high-contrast projected image with a less distortion, and a projection type display device.

To accomplish the above object, according to one aspect of the present invention, a polarization beam splitter comprises a first prism having a first aggregation layer formed on a predetermined surface of the first prism and reflecting S-polarized light in a first wavelength region, and a second aggregation layer so formed as to be stacked on the first aggregation layer and reflecting the S-polarized light in a second wavelength region longer than the first wavelength region, and a second prism fixed to the first prism through the first aggregation layer and the second aggregation layer.

According to another aspect of the present invention, an optical device for a projection type display device, comprises a polarized light splitting optical system for polarization-splitting the light emitted from a light source and letting the split light exit, and an analyzing optical system for letting light emitted from light valves for modulating incident light in accordance with an image signal enter its incidence surface, analyzing the same light and letting the light exit its exit surface, wherein the analyzing optical system includes a first aggregation layer reflecting S-polarized light in a first wavelength region and a second aggregation layer reflecting the S-polarized light in a second wavelength region longer than the first wavelength region between transparent optical members, and the first aggregation layer is provided closer to an incidence surface of the analyzing optical system than the second aggregation layer.

According to still another aspect of the present invention, an optical device for a projection type display device comprises a polarized light splitting optical system for polarization-splitting the light emitted from a light source and letting the split light exit, and an analyzing optical system for analyzed light emitted from light valves for modulating incident light in accordance with an image signal, wherein one polarization beam splitter functioning as the polarized light splitting optical system and as the analyzing optical system is provided, the polarization beam splitter contains a reflection layer reflecting S-polarized light in a first wavelength region, and a reflection layer reflecting the S-polarized light in a second wavelength region longer than the first wavelength region, and the light from the light source and the light from the light valves are incident at first upon the reflection layer reflecting the S-polarized light in the first wavelength region.

According to yet another aspect of the present invention, a projection type display device comprises a light source for supplying irradiation light, a polarized light splitting optical system for polarization-splitting the irradiation light from the light source and letting the split light exit, light valves for modulating the incident light in accordance with image signals, an analyzing optical system for making the exit light from the light valves incident upon its incidence surface, analyzing the incident light and letting the light exit its exit surface, and a projection optical system, disposed on the side of the exit surface of the analyzing optical system, for projecting an image from the light valves, wherein the analyzing optical system includes a first aggregation layer reflecting S-polarized light in a first wavelength region and a second aggregation layer reflecting the S-polarized light in a second wavelength region longer than the first wavelength region between transparent optical members, and the first aggregation layer is provided closer to an incidence surface of the analyzing optical system than the second aggregation layer.

According to a further aspect of the present invention, a projection type display device comprises a light source for supplying irradiation light, a polarized light splitting optical system for polarization-splitting the irradiation light from the light source and letting the split light exit, light valves for modulating the incident light in accordance with image signals, an analyzing optical system for analyzing the exit light from the light valves, a projection optical system, disposed on the exit side of the analyzing optical system, for projecting an image from the light valves, wherein one polarization beam splitter functioning as the polarized light splitting optical system and as the analyzing optical system is provided, the polarization beam splitter contains a reflection layer reflecting S-polarized light in a first wavelength region, and a reflection layer reflecting the S-polarized light in a second wavelength region longer than the first wavelength region, and the light from the light source and the light from the light valves are incident at first upon the reflection layer reflecting the S-polarized light in the first wavelength region.

According to a still further aspect of the present invention, a polarization beam splitter manufacturing method comprises a first aggregation layer forming step of forming, on a first prism, a first aggregation layer reflecting S-polarized light in a first wavelength region, a second aggregation layer forming step of forming a second aggregation layer reflecting the S-polarized light in a second wavelength region longer than the first wavelength region so as to be stacked on said first aggregation layer, and a fixing step of fixing a second prism to said first prism formed with said first and second aggregation layers through said first and second aggregation layers.

BRIEF DESCRIPTION OF THE DRAWINGS

FIG. 4 is a table showing a layer structure of the polarization beam splitter in the first embodiment;

FIG. 13 is a table showing a layer structure of the polarization beam splitter in the fifth embodiment;

DESCRIPTION OF THE PREFERRED EMBODIMENTS

Embodiments of the present invention will hereinafter be described with reference to the accompanying drawings.

First Embodiment

Figure 1:
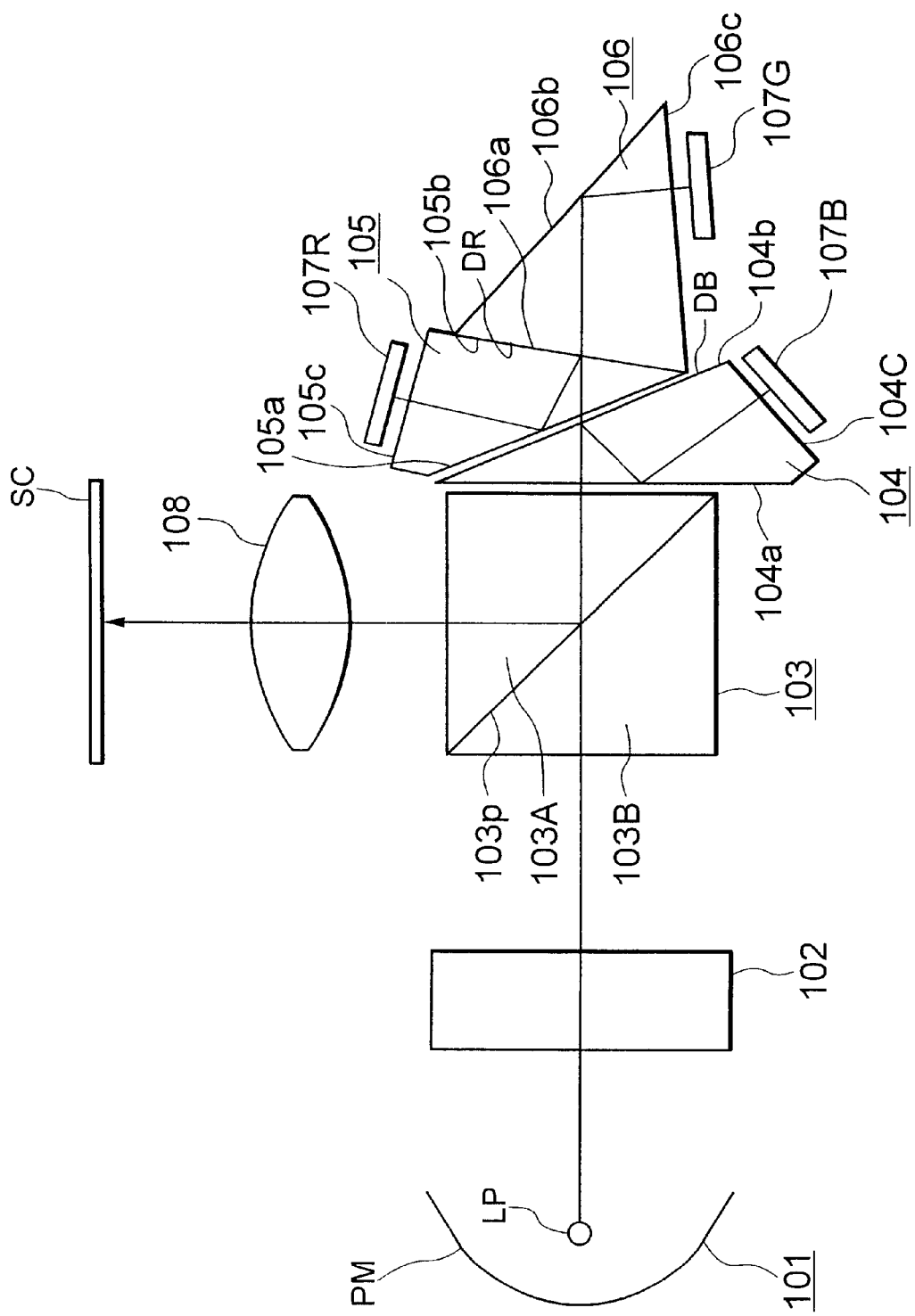
FIG. 1 is a schematic diagram showing a configuration of a projection type display device in a first embodiment of the present invention.

FIG. 1 is a schematic diagram showing a configuration of a projection type display device in a first embodiment of the present invention. A light source 101 constructed of a lamp LP and a parabolic mirror PM emits light source light (which will hereinafter simply referred to as LS light). The LS light enters a polarized light converting unit 102. The polarized light converting unit 102 converts random polarized light into P-polarized light.

Figure 2:
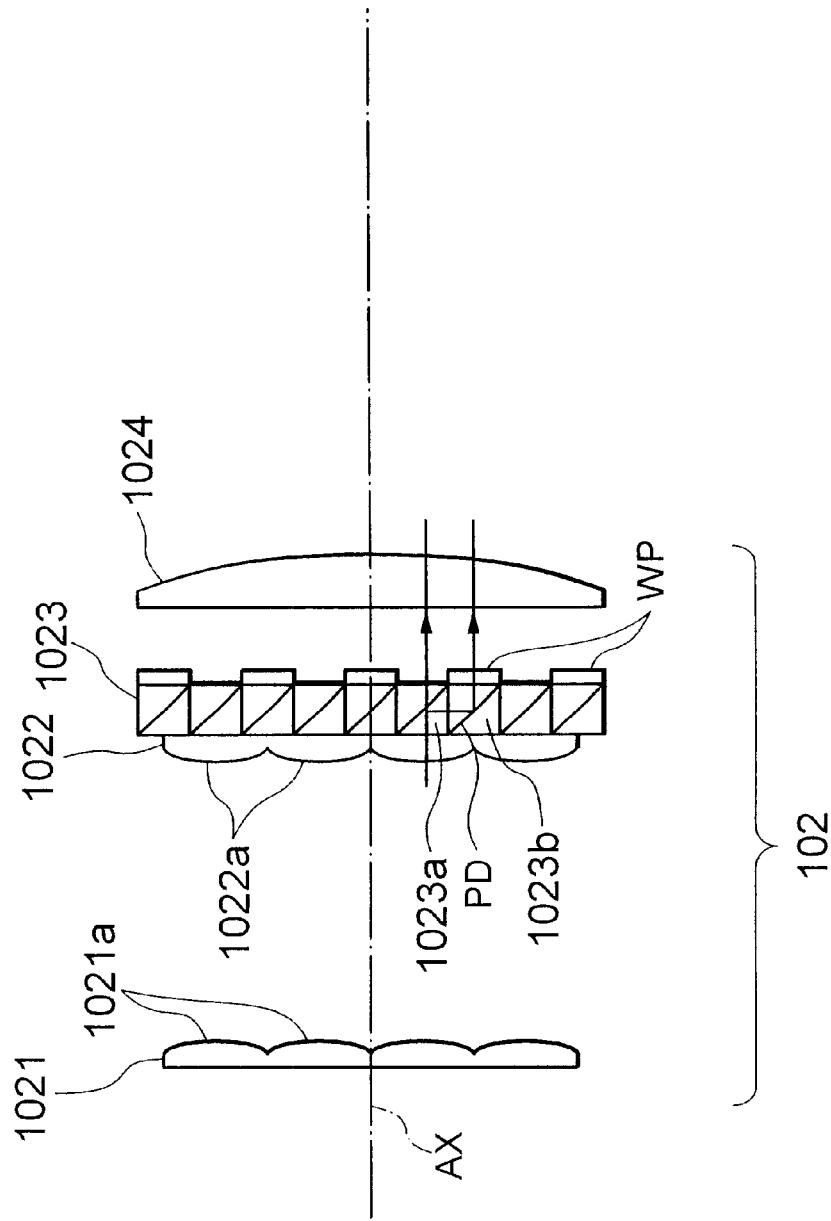
FIG. 2 is a diagram showing a configuration of a polarized light converting unit in the first embodiment.

FIG. 2 is a diagram showing a configuration of the polarized light converting unit 102. The polarized light converting unit 102 is constructed of a first lens plate 1021, a second lens plate 1022, a polarization beam splitter array 1023, a ½ wave plate WP and a condenser lens 1024, which are disposed in sequence from the light source 101. The first lens plate 1021 includes a plurality of lens elements 1021a arrayed in plane. The second lens plate 1022 includes a plurality of lens elements 1022a arrayed in plane, corresponding to the lens elements 1021a. Further, the polarization beam splitter array 1023 has such a structure that polarized light splitting elements PD of a plurality of polarization beam splitter elements 1023a, 1023b are arrayed in parallel with each other. Herein, an exit surface of the predetermined polarization beam splitter element 1023b is provided with the ½ wave plate WP. Then, the condenser lens 1024 is provided on the exit side of the polarization beam splitter array 1023.

In the thus constructed polarized light converting unit 102, the LS light, which enters the first lens plate 1021, is split into a plurality of beams defined by external shapes of the lens elements 1021a. The thus split beams are converged on the lens elements 1022a disposed corresponding to the lens elements 1021a. Then, luminous points are formed on the respective lens elements 1022a.

The beams emerging from these luminous points enter the polarization beam splitter array 1023. The incidence light is split into P-polarized light penetrating the polarization beam splitter elements 1023a and S-polarized light reflected by the polarized light splitting elements PD. The S-polarized light reflected by the polarized light splitting element PD enters other adjacent polarization beam splitter element 1023b, and is then reflected by the polarized light splitting element PD of the same other polarization beam splitter element 1023b and exits. An exit surface of the S-polarized light is provided with the ½ wave plate WP. Hence, the S-polarized light is converted by the ½ wave plate WP into the P-polarized light and then exits. Accordingly, the beams exiting the polarized light converting unit 102 are converted into the P-polarized light on the whole. Then, the P-polarized light travels to the polarization beam splitter 103 via the condenser lens 1024.

The polarization beam splitter 103 is constructed of a first rectangular prism 103A and a second rectangular prism 103B each taking a shape of triangular column, and a polarized light splitting element 103p formed on a bonded surface of these two prisms 103A and 103B. The polarized light splitting element 103p polarization-splits the light from the polarized light converting unit 102 into the P-polarized light penetrating the polarized light splitting element 103p and the S-polarized light reflected therefrom. The transmitted P-polarized light exits the polarization beam splitter 103. Note that the polarization beam splitter 103, because of the incidence light being the P-polarized light, substantially transmits and lets a large proportion of the P-polarized light exit. Still further, the polarization beam splitter 103 also has a function of reflecting and discarding the S-polarized light components unable to be polarization-converted by the polarized light converting unit 102 and remaining in the incidence light. A detailed description of this polarization beam splitter 103 will be given later on.

The P-polarized light penetrating the polarized light splitting element 103p and exiting the polarization beam splitter 103, enters a color separating/synthesizing prism constructed of prisms 104, 105, 106 and a plurality of dichroic layers formed on predetermined surfaces of these prisms. Further, the unnecessary S-polarized light reflected by the polarized light splitting element 103p, after its optical path has been deflected at 90 degrees, travels along this deflected optical path and is then discarded.

Next, the discussion will be focused on a configuration in which the color separating/synthesizing prism color-separates the LS light into R(red)-light, G(green)-light and B(blue)-light. As explained above, the color separating/synthesizing prism is constructed of three pieces of prisms 104, 105 and 106.

To start with, the prism 104 for extracting the B-light component out of the LS light will be described.

The prism 104 has a first surface 104a, a second surface 104b and a third surface 104c. The first surface 104a transmits the LS light. The second surface 104b has a B-light reflection dichroic layer DB that reflects the B-light and transmits the R- and G-light. The B-light reflected from the second surface 104b and next totally reflected from the first surface 104a, exits the third surface 104c. With this configuration, the prism 104 is capable of extracting the B-light component out of the LS light emitted from the light source 101.

The B-light emerging from the third surface 104c enters a light valve 107B for the B-light.

Next, the prism 105 for extracting the R-light component out of the LS light will be explained.

The prism 105 is provided with an air gap from the second surface 104b of the prism 104. The prism 105 has a first surface 105a, a second surface 105b and a third surface 105c. The first surface 105a transmits the R- and G-light penetrating the second surface 104b of the prism 104. The second surface 105b has an R-light reflection dichroic layer DR that reflects the R-light and transmits the G-light. The R-light reflected from the second surface 105b and next totally reflected from the first surface 105a, exits the third surface 105c. With this configuration, the prism 105 is capable of extracting the R-light component out of the LS light emitted from the light source 101.

The R-light emerging from the third surface 105c enters a light valve 107R for the R-light.

Next, the prism 106 for extracting the G-light component out of the LS light will be explained.

The prism 106 is provided such that its first surface 106a is fixed by a bonding agent to the second surface 105b of the prism 105.

The prism 106 has a first surface 106a, a second surface 106b and a third surface 106c. The first surface 106a transmits the G-light penetrating the second surface 105b of the prism 105. The second surface 106b totally reflects the G-light. The G-light totally reflected from the second surface 106b exits the third surface 106c. With this configuration, the prism 106 is capable of extracting the G-light component out of the LS light emitted from the light source 101.

The G-light emerging from the third surface 106c enters a light valve 107G for the G-light.

It is desirable that the prisms 103A, 103B of the polarization beam splitter 103 and the prisms 104, 105, 106 involve the use of a glass in which an absolute value of a photoelastic constant is no more than $1.5 \times 10^{-8}$ cm$^2$/N with respect to any of the R-, G and B-light so that a polarized state of the light traveling through inside these prisms does not change.

Next, the light valves will be explained. The light valves 107B, 107G and 107R are classified as reflection type liquid crystal light valves. The light valve has a plurality of pixels arranged in matrix. Each pixel has a liquid crystal layer containing liquid crystal molecules, and a reflection layer provided on a rear surface of the liquid crystal layer. The liquid crystal layer is capable of changing an orientation of the liquid crystal molecules by applying a voltage across the liquid crystal layer in a thicknesswise direction thereof in a way that changes the voltage value with a switching element such as TFTs each disposed for every pixel. Then, an inclination of the polarization of the light entering the light valve changes corresponding to the orientation of the liquid crystal molecules. Namely, the polarized state of the incidence light can be modulated. Thus, the polarized state is changed by varying the voltage to be applied, whereby a gradation level of an image can be determined.

The pixel, with no voltage applied to the liquid crystal layer, of the light valve, is lowest in its gradation level, i.e., the darkest pixel. In this case, the liquid crystal molecules of the liquid crystal layer are kept in an initial state. The light traveling through the liquid crystal layer in this state, then reflected by the reflection layer and exiting again via the liquid crystal layer, becomes non-modulated light undergoing no action of the modulation. Then, the non-modulated light reenters, as the P-polarized light, the color separating/synthesizing prism.

Further, the pixel, with the highest voltage applied to the liquid crystal layer, of the light valve, is highest in its gradation level, i.e., the brightest pixel. In this case, the liquid crystal layer is off the initial state and arrayed in a predetermined direction, thereby forming a wave plate layer. The light traveling via the liquid crystal layer, reflected by the reflection layer and exiting again via the liquid crystal layer, undergoes the action of the modulation and becomes the modulated light. Then, the modulated light reenters, as the S-polarized light, the color separating/synthesizing prism.

The color separating/synthesizing prism color-synthesizes the light reflected from the light valves 107R, 107G and 107B. The color-synthesized light is incident upon the polarization beam splitter 103 and analyzed by the polarized light splitting element 103p. Then, only the S-polarized light component defined as the light modulated by the light valve is reflected and enters a projection lens 108. The projection lens 108 projects a light valve image in R, G and B colors as a full-color image on a screen SC. Note that the P-polarized light component defined as the non-modulated light travels straight through the polarized light splitting element 103p of the polarization beam splitter 103, then exits on the side of the light source 101 and is discarded.

Figure 3:
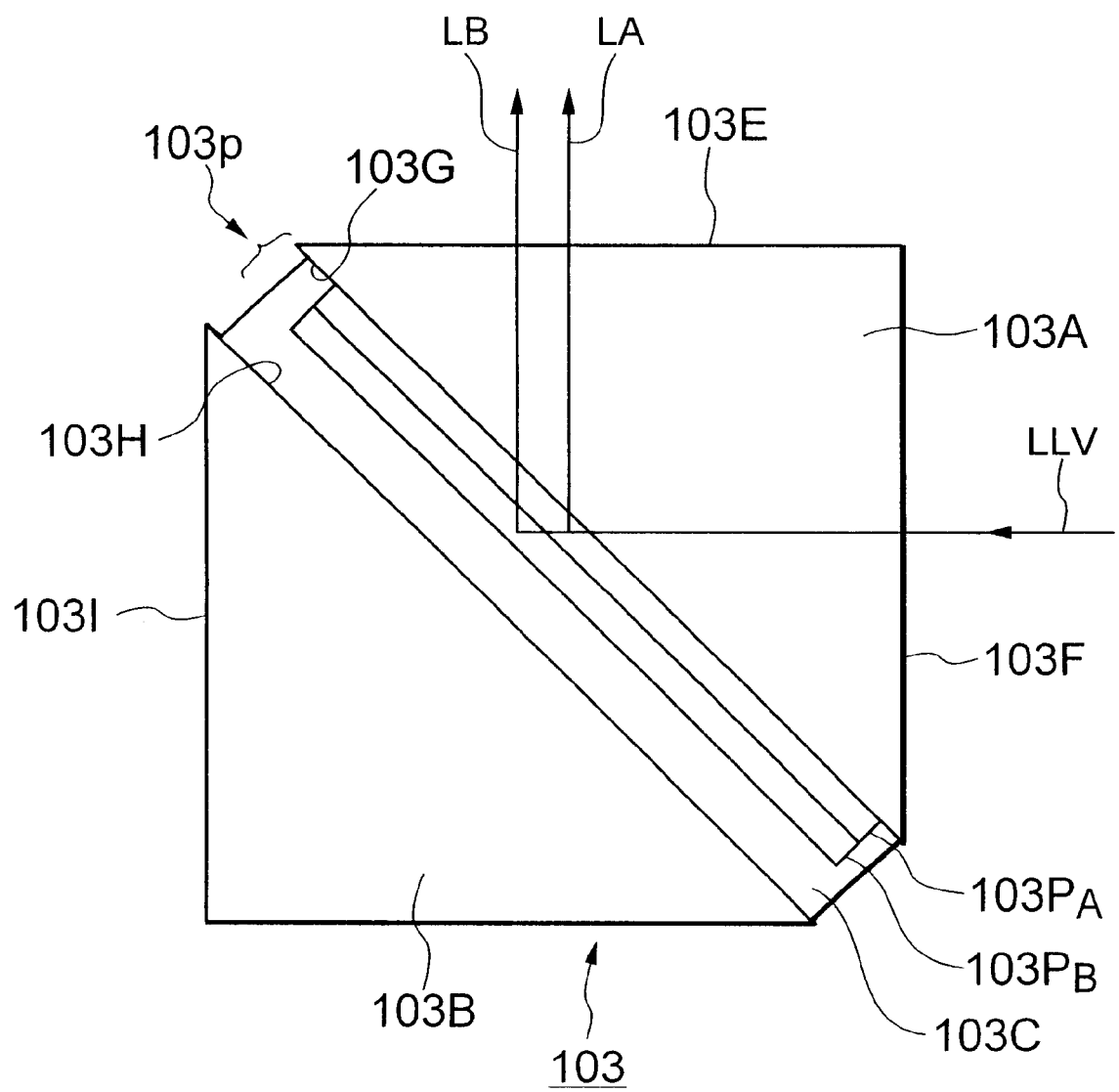
FIG. 3 is a schematic diagram showing a configuration of a polarization beam splitter in the first embodiment of the present invention.

Next, the polarization beam splitter 103 will be explained in detail. FIG. 3 is sectional view depicting a configuration of the polarization beam splitter 103. The polarization beam splitter 103 is constructed of the first rectangular prism 103A and the second rectangular prism 103B. Alternate layers 103PA of a first dielectric substance are formed by a physical vapor deposition on an inclined surface 103G of the first rectangular prism 103A. Note that the whole of the alternate layers of the dielectric substance will hereinafter be called a [dielectric substance aggregation layer]. Further, a second dielectric substance aggregation layer 103PB is so formed by the physical vapor deposition as to be superposed (i.e., stacked) on the first dielectric substance aggregation layer 103PA. The first dielectric substance aggregation layer 103PA reflects the S-polarized light in a first wavelength region (a reference design wavelength $\lambda$=420 nm). Further, the second dielectric substance aggregation layer 103 PB reflects the S-polarized light in a second wavelength region (a reference design wavelength $\lambda 2$=600 nm). Then, the first and second rectangular prisms 103A and 103B are bonded by an epoxy-series optical bonding agent layer 103C through the first and second dielectric substance aggregation layers 103PA, 103PB. Note that the polarized light splitting element 103p described above is what the first and second dielectric substance aggregation layers 103PA, 103PB are generically categorized.

FIG. 4 is a table showing a structure of the first and second dielectric substance aggregation layers 103PA, 103PB. Serial numbers given at the left end in FIG. 4 indicate orders of the materials constituting the respective dielectric substance aggregation layers, which are counted from the side of the first rectangular prism 103A. The first dielectric substance aggregation layer 103PA is composed of the materials numbered 1 through 19. Further, the second dielectric substance aggregation layer 103PB is composed of materials numbered 20 through 38.

The first dielectric substance aggregation layer 103PA is configured by alternately stacking a layer of $TiO_2$ of a high refractive index material nH1=2.38 and a layer of $SiO_2$ of a low refractive index material nL1=1.47 when the reference design wavelength $\lambda 1$=420 nm. Further, the second dielectric substance aggregation layer 103PB is configured by alternately stacking layer of $TiO_2$ of a high refractive index material nH2=2.38 and a layer of $Al_2O_3$ of a low refractive index material nL1=1.65 when the reference design wavelength $\lambda 1$=680 nm. Moreover, the first and second rectangular prisms 103A, 103B are each composed of glass SF57 (made by Shott Glaswerke Corp.).

Figure 5:
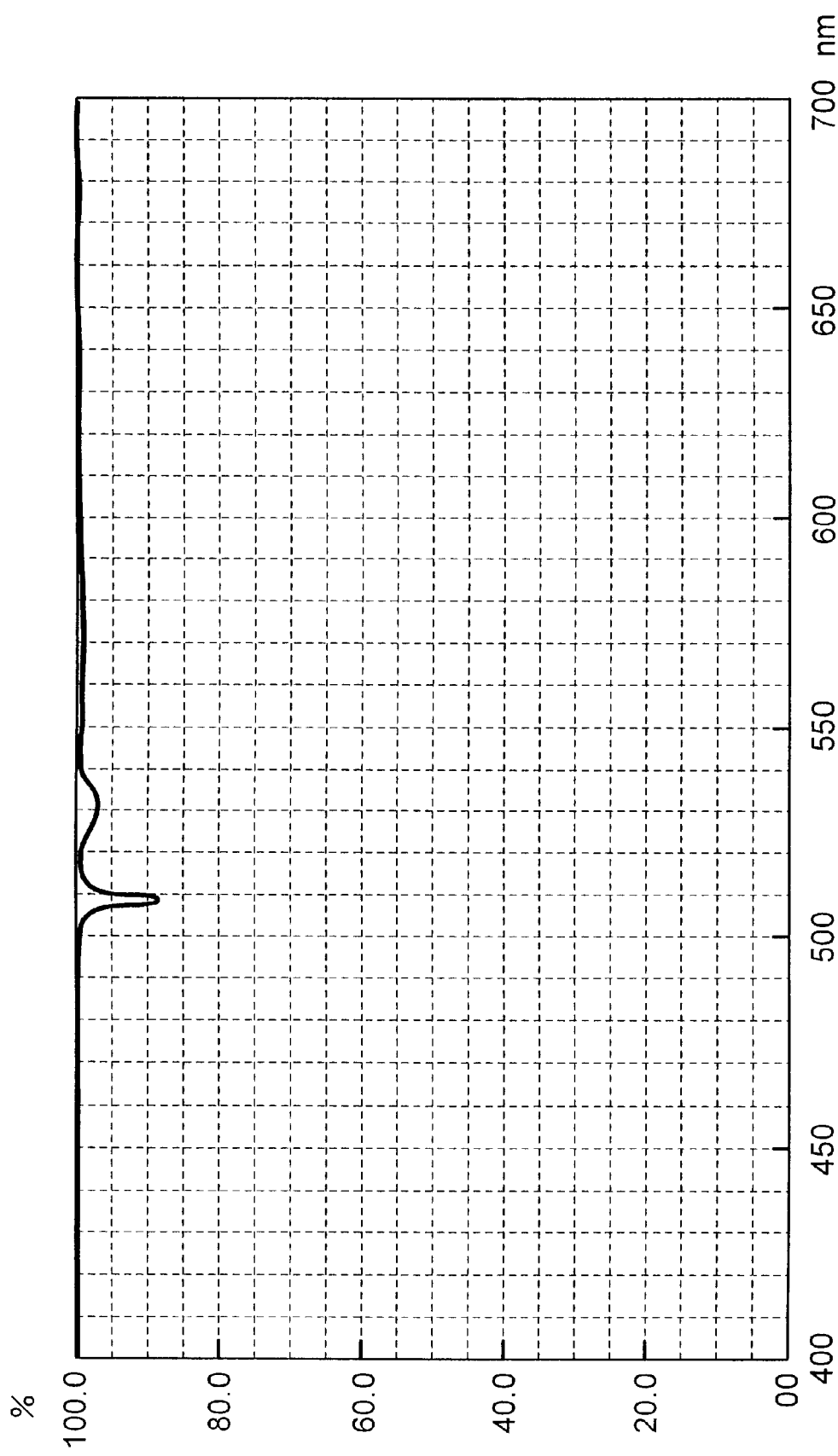
FIG. 5 is a graph plotting a reflectance characteristic of the polarization beam splitter in the first embodiment.
Figure 6:
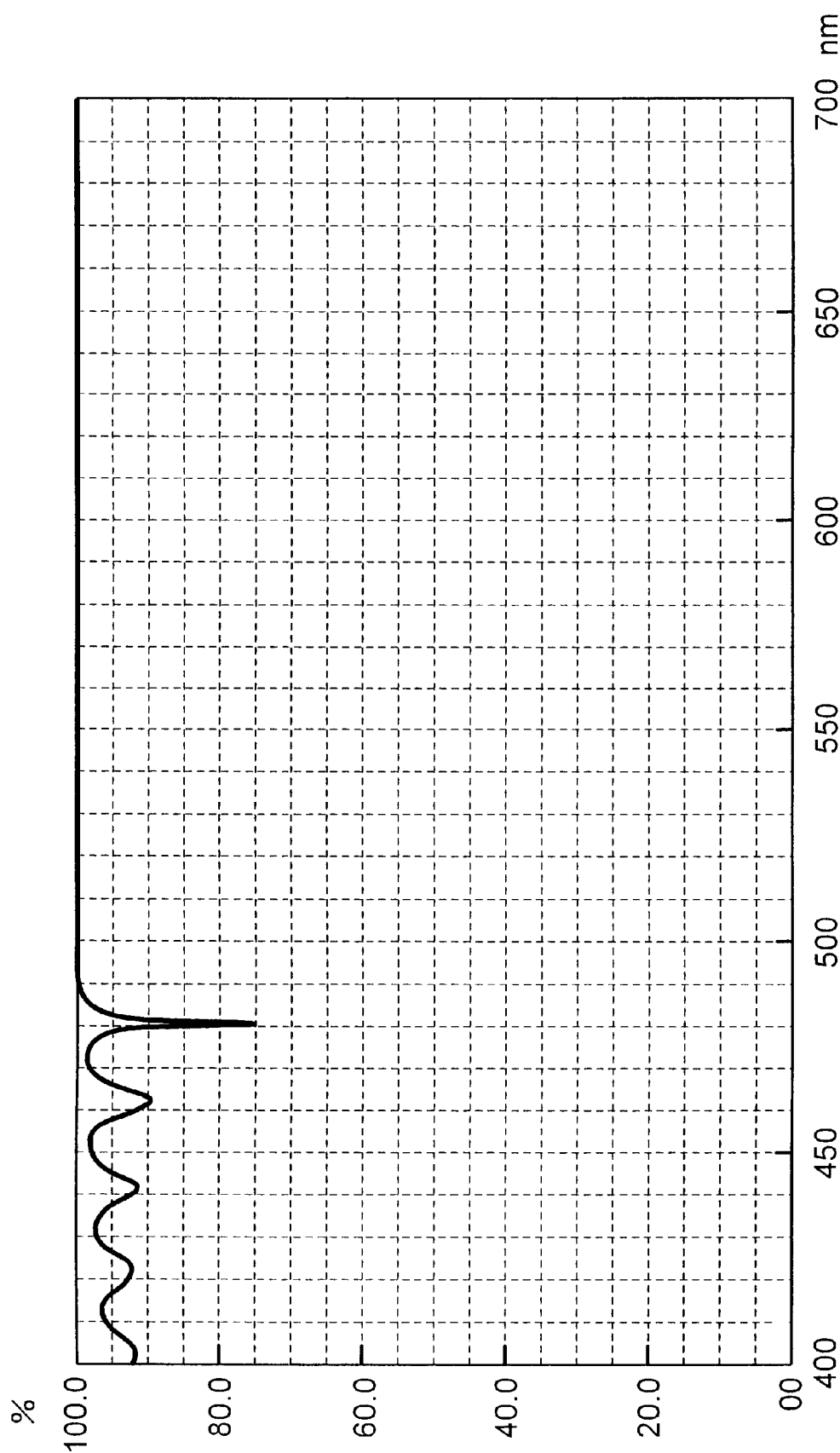
FIG. 6 is a table showing a layer structure of a conventional polarization beam splitter.

Further, FIG. 5 is a graph plotting a reflectance characteristic of the S-polarized light component reflected by the polarized light splitting element 103p when the perfect S-polarized light enters a surface 103F of the polarization beam splitter 103. Referring to FIG. 5, the axis of abscissa indicates the wavelength (unit: nm), and the axis of ordinate indicates the reflectance (unit: percentage). It is to be noted that the same units will hereinafter be used throughout all the graphs each plotting the reflectance characteristic. Further, FIG. 6 is a graph plotting the reflectance characteristic when similarly the perfect S-polarized light is made incident by use of the polarization beam splitter in the prior art. As obvious from a comparison between FIGS. 5 and 6, the polarization beam splitter 103 in the first embodiment, it can be understood, has a preferable reflectance characteristic over a broad wavelength band.

Next, referring back to FIG. 3, a polarized light splitting function of the polarization beam splitter 103 will be explained. As discussed above, mixed light LLV of the non-modulated light (P-polarized light) and the modulated light (S-polarized light) corresponding to image signals, is reflected from an unillustrated light valve. The mixed light LLV enters the surface 103F of the first rectangular prism 103A. Then, the first dielectric substance aggregation layer 103PA reflects, as analyzed light LA, the modulated light (S-polarized light), in a short wavelength (420 nm) region, of the mixed light LLV. The analyzed light LA reflected by the first dielectric substance aggregation layer 103PA exits a surface 103E of the first rectangular prism 103A. Further, the first dielectric substance aggregation layer 103PA transmits the non-modulated light (P-polarized light), in the short wavelength (420 nm) region, of the mixed light LLV. Moreover, the first dielectric substance aggregation layer 103PA transmits the modulated light (S-polarized light) and the non-modulated light (P-polarized light), in a long wavelength (600 nm) region, of the mixed light LLV.

Next, the second dielectric substance aggregation layer 103PB reflects, as analyzed light LB, the modulated light (S-polarized light), in the long wavelength (600 mn) region, of the mixed light LLV. The analyzed light LB reflected by the second dielectric substance aggregation layer 103PB exits the surface 103E of the first rectangular prism 103A. Further, the second dielectric substance aggregation layer 103PB transmits the non-modulated light (P-polarized light), in the long wavelength (600 nm) region, of the mixed light LLV. Moreover, the second dielectric substance aggregation layer 103PB further transmits the non-modulated light (P-polarized light) in the short wavelength (420 nm) region that has penetrated the first dielectric substance aggregation layer 103PA. As a result, the non-modulated light (P-polarized light) in the short wavelength (420 nm) region and the non-modulated light (P-polarized light) in the long wavelength (600 nm) region, of the mixed light LLV, travel through the bonding agent layer 103C and enter the surface 103H of the second rectangular prism 103B. Then, these two fluxes of non-modulated light directly travel straight through inside the second rectangular prism 103B, then exit the surface 103I towards the unillustrated light source 101 and are discarded.

As described above, an attenuation coefficient k of a complex refractive index of the material constituting the dielectric substance aggregation layer is larger with respect to the light in the short wavelength region than in the long wavelength region. According to the first embodiment, the modulated light (S-polarized light) of the light in the short wavelength region is reflected by the first dielectric substance aggregation layer 103PA (the reference wavelength $\lambda 1$=420 nm). It is therefore possible to shorten the optical path along which the modulated light (S-polarized light) of the light in the short wavelength region travels without penetrating the second dielectric substance aggregation layer 103PB in the polarized light splitting element 103p. This configuration exhibits such an effect that there can be decreased both of the interaction between the modulated light (S-polarized light) having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Second Embodiment

Figure 7:
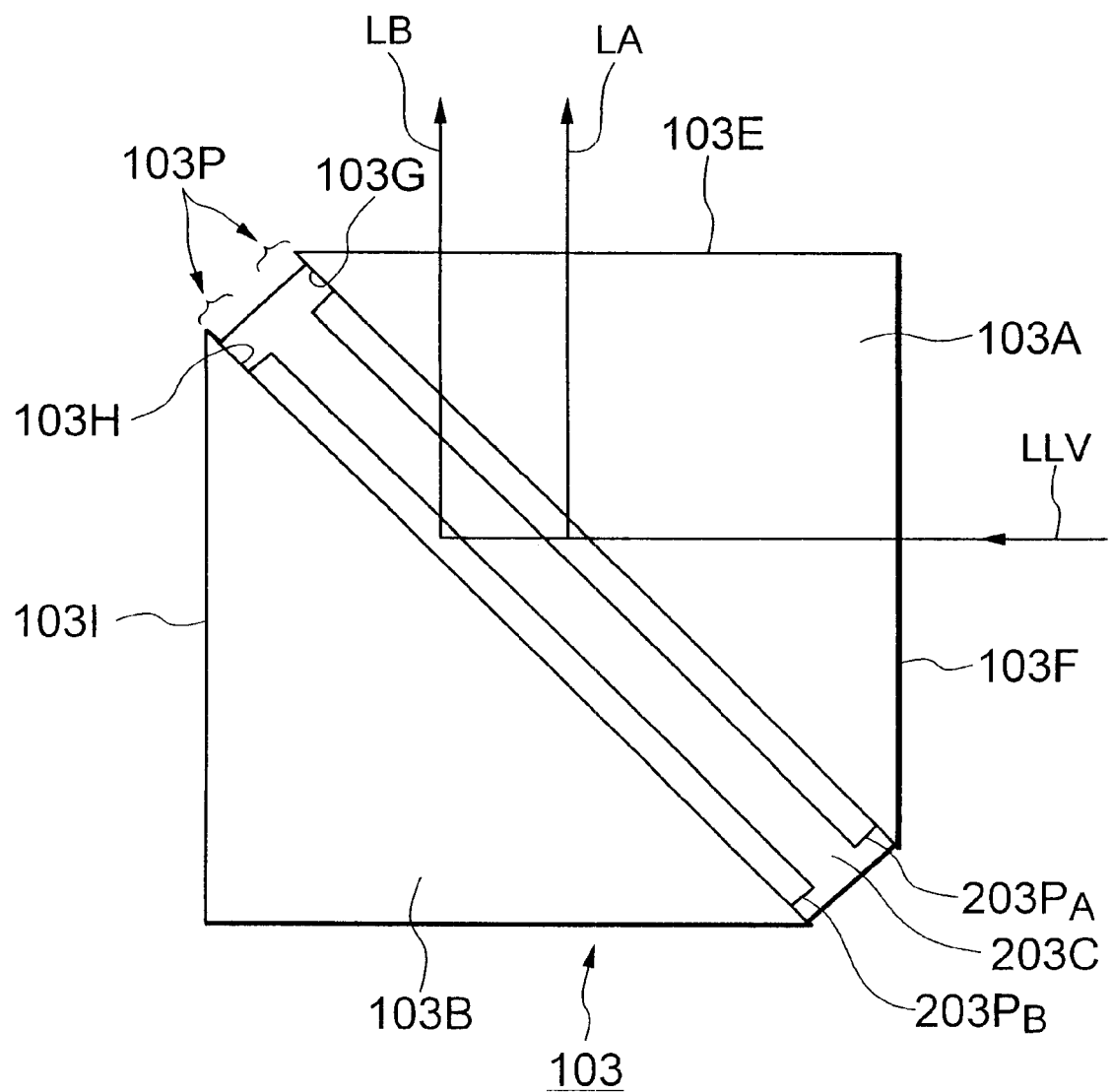
FIG. 7 is a schematic diagram showing a configuration of the polarization beam splitter in a second embodiment of the present invention.

The discussion in a second embodiment of the present invention will be focused on an example where the polarization beam splitter 103 shown in FIG. 7 is applied to the projection type display device in FIG. 1.

FIG. 7 is a diagram showing a sectional configuration of the polarization beam splitter in the second embodiment. A first dielectric substance aggregation layer 203PA is formed by the physical vapor deposition on an inclined surface 103G of the first rectangular prism 103A. A second dielectric substance aggregation layer 203PB is formed by the physical vapor deposition on an inclined surface 103H of the second rectangular prism 103B. The reference design wavelength λ1 of the first dielectric substance aggregation layer 203PA is 420 nm. The reference design wavelength λ2 of the second dielectric substance aggregation layer 203PB is 600 nm. Then, the first and second rectangular prisms 103A and 103B are bonded by an epoxy-series optical bonding agent layer 203C through the first and second dielectric substance aggregation layers 203PA, 203PB. Note that the polarized light splitting element 103p is what the first and second dielectric substance aggregation layers 203PA, 203PB are generically categorized.

The first dielectric substance aggregation layer 203PA is composed of the materials numbered 1 through 19 in FIG. 4. Further, the second dielectric substance aggregation layer 203PB is composed of materials numbered 20 through 38. Other configurations are the same as those in the first embodiment. Hence, the same components are marked with the same reference symbols, and their repetitive explanations are herein omitted.

The reflectance characteristics of the polarization beam splitter in the second embodiment has the same characteristics (FIG. 5) described in the first embodiment. The configuration described above exhibits, as in the first embodiment, such an effect that there can be decreased both of the interaction between the modulated light (S-polarized light) having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Third Embodiment

Figure 8:
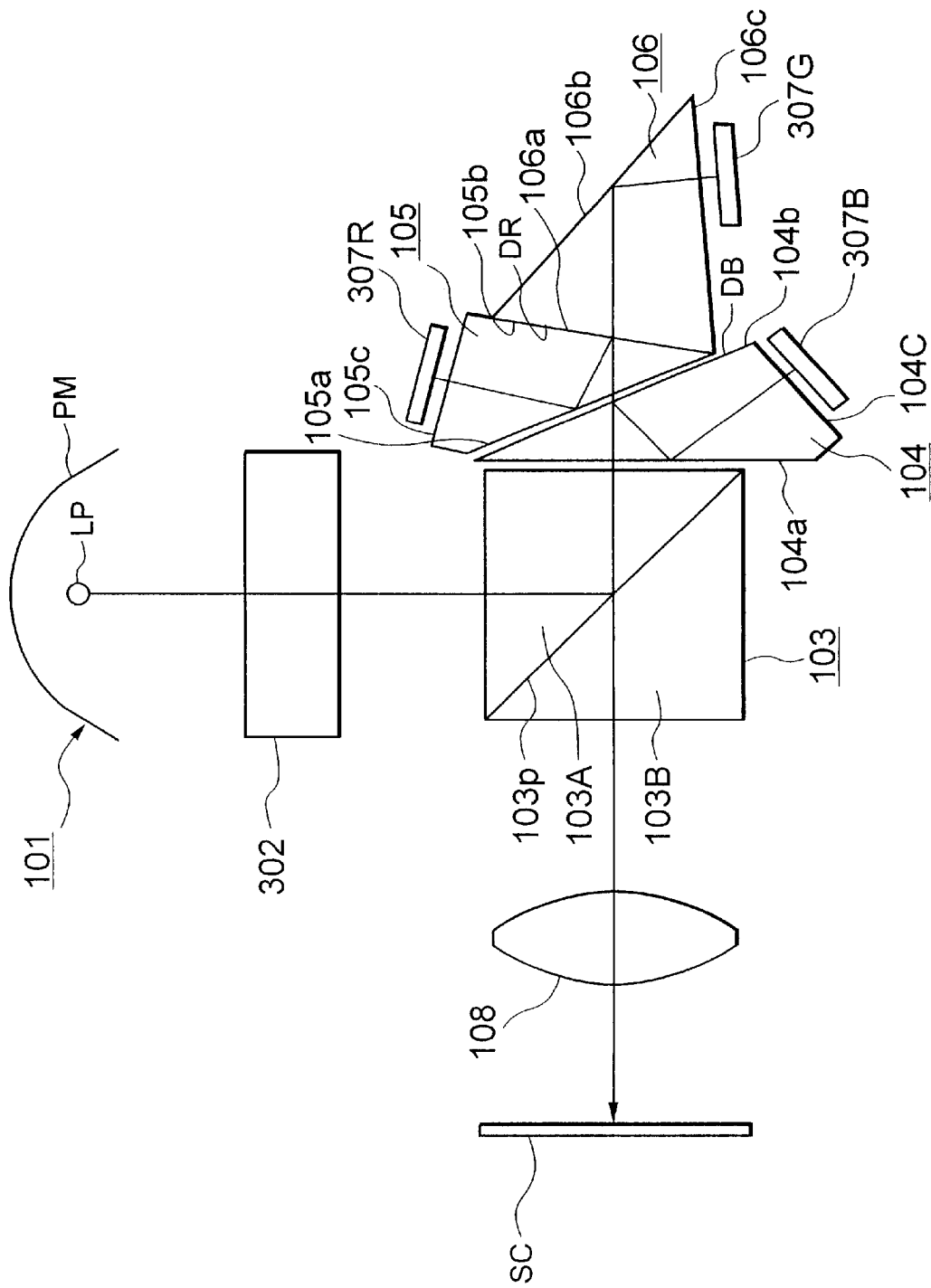
FIG. 8 is a schematic diagram showing a configuration of the projection type display device in a third embodiment of the present invention.

FIG. 8 is a schematic diagram illustrating a configuration of the projection type display device in a third embodiment of the present invention. A difference of the third embodiment from the first embodiment is that the S-polarized light component of the light emitted from the light source is led to respective color light valves 307B, 307R, 307G. Other configurations are the same as those in the first embodiment. Hence, the same components are marked with the same reference symbols, and their repetitive explanations are herein omitted.

The light source 101 constructed of the lamp LP and the parabolic mirror PM emits the LS light. The LS light enters a polarized light converting unit 302. The polarized light converting unit 102 converts the random polarized light into the S-polarized light.

Figure 9:
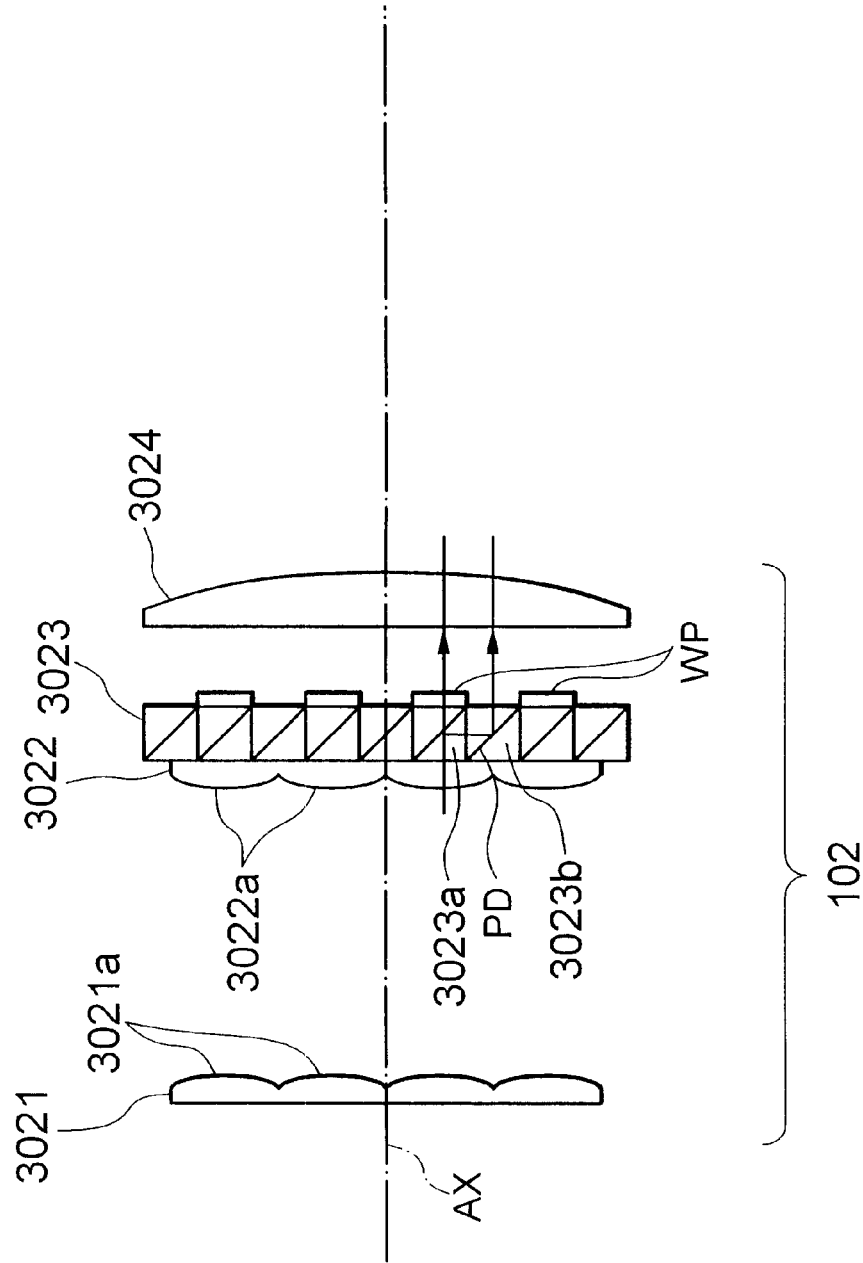
FIG. 9 is a diagram showing a configuration of the polarized light converting unit in the third embodiment.

FIG. 9 is a diagram showing a configuration of the polarized light converting unit 302. The polarized light converting unit 302 is constructed of a first lens plate 3021, a second lens plate 3022, a polarization beam splitter array 3023, a ½ wave plate WP and a condenser lens 3024, which are disposed in sequence from the light source 101. The first lens plate 3021 includes a plurality of lens elements 3021a arrayed in plane. The second lens plate 3022 includes a plurality of lens elements 3022a arrayed in plane, corresponding to the lens elements 3021a. Further, the polarization beam splitter array 3023 has such a structure that polarized light splitting elements PD of a plurality of polarization beam splitter elements 3023a, 3023b are arrayed in parallel with each other. Herein, incidence surface of the predetermined polarization beam splitter element 3023b is provided with the ½ wave plate WP. Then, the condenser lens 3024 is provided on the exit side of the polarization beam splitter array 3023.

In the thus constructed polarized light converting unit 302, the LS light, which enters the first lens plate 3021, is split into a plurality of beams defined by external shapes of the lens elements 3021a. The thus split beams are converged on the lens elements 3022a disposed corresponding to the lens elements 3021a. Then, luminous points are formed on the respective lens elements 3022a.

The beams emerging from these luminous points enter the polarization beam splitter array 3023. The incidence light is split into P-polarized light penetrating the polarization beam splitting elements 3023a and the S-polarized light reflected by the polarized light splitting elements PD. An exit surface of the P-polarized light is provided with the ½ wave plate WP. Hence, the P-polarized light is converted by the ½ wave plate WP into the S-polarized light and then exits. Further, the S-polarized light reflected by the polarized light splitting element PD is incident upon other adjacent polarization beam splitter 3023b, then reflected by the polarized light splitting element PD of the polarization beam splitter element 3023b and exits. Accordingly, the beams exiting the polarized light converting unit 302 are converted into the s-polarized light on the whole. The S-polarized light travels to the polarization beam splitter 103 via the condenser lens 3024.

The polarization beam splitter 103 has the same configuration as that of the polarization beam splitter described in the first embodiment discussed above. The polarized light splitting element 103p polarization-splits the light from the polarized light converting unit 302 into the P-polarized light penetrating the polarized light splitting element 103p and the S-polarized light reflected therefrom. The reflected S-polarized light exits the polarization beam splitter 103. Note that the polarization beam splitter 103, because of the incidence light being the S-polarized light, substantially reflects and lets a large proportion of the S-polarized light exit. Still further, the polarization beam splitter 103 also has a function of transmitting and discarding the P-polarized light components unable to be polarization-converted by the polarized light converting unit 302 and remaining in the incidence light. A detailed description of this polarization beam splitter 103 will be given later on.

The configurations and the functions of the prisms 104, 105, 106 are the same as those in the first embodiment. Therefore the same components are marked with the same reference symbols, and their repetitive explanations are herein omitted.

Next, the light valves will be explained. The light valves 307B, 307G and 307R are classified as reflection type liquid crystal light valves. A difference of the light valve in the third embodiment from the light valve explained in the first embodiment is, however, that the modulated light is the P-polarized light component, and the non-modulated light is the S-polarized light component. Other basic configurations are the same as those in the first embodiment, and hence the repetitive explanations are omitted.

The prisms 104, 105, 106 categorized as the color separating/synthesizing prisms color-synthesize the light reflected from the light valves 307R, 307G, 307B. The color-synthesized light is incident upon the polarization beam splitter 103 and analyzed by the polarized light splitting element 103p. Then, only the P-polarized light component defined as the light modulated by each of the light valves penetrates and enters the projection lens 108. The projection lens 108 projects an image formed by the R-, G- and B-color light valves as a full-color image on the screen SC. Note that the S-polarized light component defined as the non-modulated light is reflected by the polarized light splitting element 103p of the polarization beam splitter 103, then exits on the side of the light source 101 and is discarded.

Figure 10:
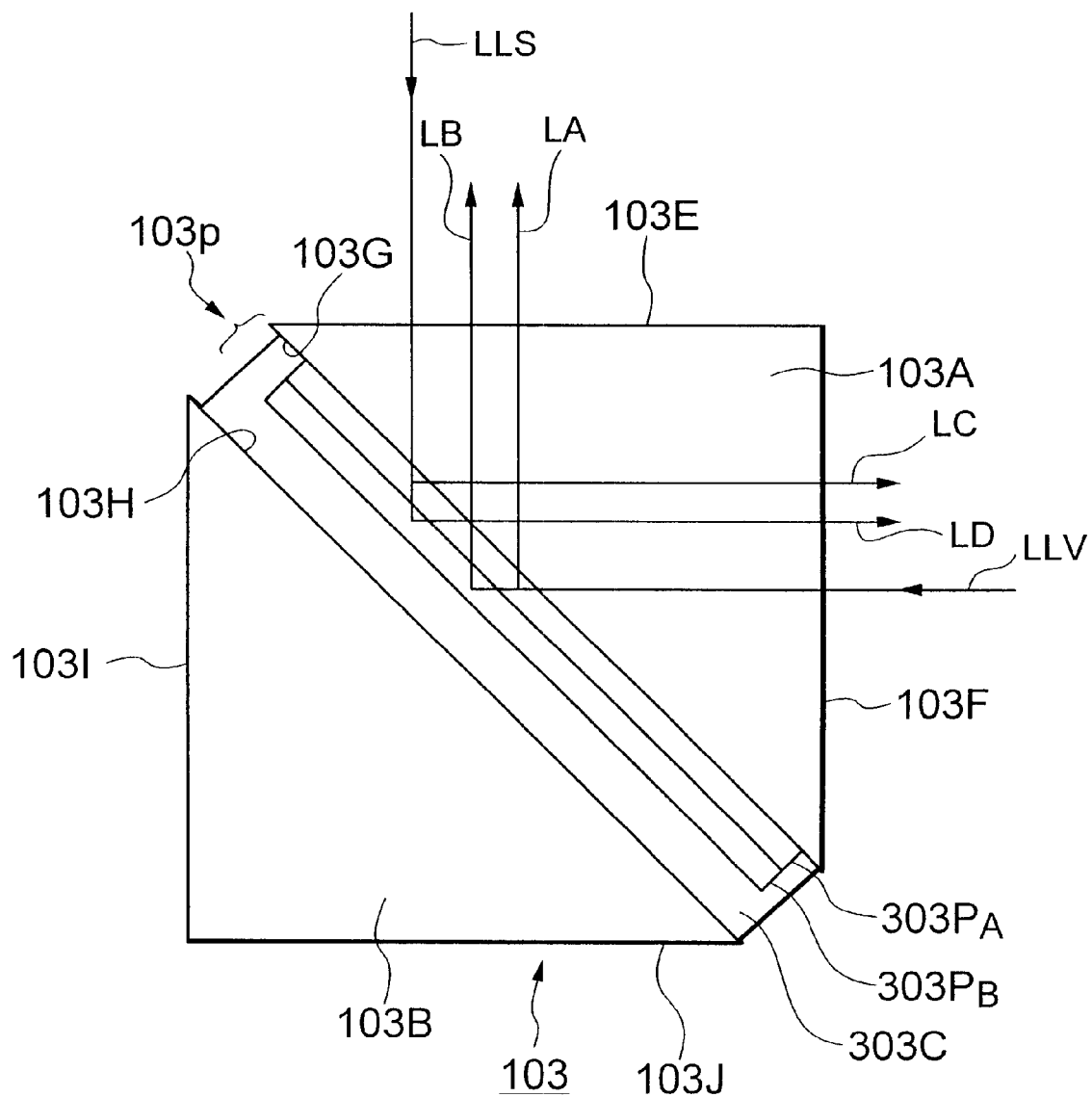
FIG. 10 is a schematic diagram showing a configuration of the polarization beam splitter in the third embodiment.

Next, the configuration of the polarization beam splitter 103 will be explained referring to FIG. 10. The polarization beam splitter 103 is constructed of the first rectangular prism 103A and the second rectangular prism 103B. A first dielectric substance aggregation layer 303PA is formed by the physical vapor deposition on the inclined surface 103G of the first rectangular prism 103A. Further, a second dielectric substance aggregation layer 303PB is so formed by the physical vapor deposition as to be stacked on the first dielectric substance aggregation layer 303PA. The reference design wavelength $\lambda 1$ of the first dielectric substance aggregation layer 303PA is 420 nm. Further, the reference design wavelength $\lambda 2$ of the second dielectric substance aggregation layer 303PB is 600 nm. The first and second rectangular prisms 103A and 103B are bonded by an epoxy-series optical bonding agent layer 303C through the first and second dielectric substance aggregation layers 303PA, 303PB. Note that the polarized light splitting element 103p described above is what the first and second dielectric substance aggregation layers 303PA, 303PB are generically categorized.

The structures and the reflectance characteristics of the first and second dielectric substance aggregation layers 303PA, 303PB are the same as those explained in the first embodiment (FIGS. 4 and 5), and therefore the repetitive explanations are omitted.

Next, a polarized light splitting function of the polarization beam splitter 103 will be described with reference to FIG. 10. To begin with, light LLS emitted from the light source (unillustrated) will be explained. The light LLS from the light source 101 enters the surface 103E of the first rectangular prism 103A. The first dielectric substance aggregation layer 303PA reflects S-polarized light LC, in the short wavelength region, of the light LLS. The S-polarized light LC reflected by the first dielectric substance aggregation layer 303PA exits the surface 103F of the first rectangular prism 103A. Further, the first dielectric substance aggregation layer 303PA transmits the S-polarized light, in the long wavelength region, of the light LLS. Next, the second dielectric substance aggregation layer 303PB reflects S-polarized light LD, in the long wavelength region, of the light LLS. The S-polarized light LD reflected by the second dielectric substance aggregation layer 303PB exits the surface 103F of the first rectangular prism 103A. Further, the P-polarized light in the long and short wavelength regions, of the light LLS travel through the first and second dielectric substance aggregation layer 303PA, 303PB and the bonding agent layer 303C as well. Next, the P-polarized light enters the surface 103H of the second rectangular prism 103B. Then, the P-polarized light travels straight through inside the second rectangular prism 103B, then exits the surface 103J and is discarded.

Next, the mixed light LLV from the light valves 307B, 307R and 307G will be described. The mixed light LLV enters the surface 103F of the first rectangular prism 103A. The first dielectric substance aggregation layer 303PA reflects non-modulated light (S-polarized light) LA, in the short wavelength region, of the light LLV. The non-modulated light (S-polarized light) LA reflected by the first dielectric substance aggregation layer 303PA exits the surface 103E of the first rectangular prism 103A. Further, the first dielectric substance aggregation layer 303PA transmits the non-modulated light (S-polarized light), in the long wavelength region, of the mixed light LLV. Next, the second dielectric substance aggregation layer 303PB reflects non-modulated light (S-polarized light) LB, in the long wavelength region, of the mixed light LLV. The non-modulated light (S-polarized light) LB reflected by the second dielectric substance aggregation layer 303PB exits the surface 103E of the first rectangular prism 103A. The non-modulated light (S-polarized light) LA in the short wavelength region and the non-modulated light (S-polarized light) LB, which have exited the surface 103E of the first rectangular prism 103A, are discarded toward the unillustrated light source 101.

Further, the modulated light (P-polarized light), in the long and short wavelength regions, of the mixed light LLV pass through the first and second dielectric substance aggregation layers 303PA, 303PB and the bonding agent layer 303C. Next, the modulated light (P-polarized light) enters the surface 103H of the second rectangular prism 103B. Then, the modulated light travels straight through inside the second rectangular prism 103B and exits the surface 103I. This modulated light (P-polarized light) is projected as an image formed by the light valves 307B, 307R, 307G on the screen SC (unillustrated).

Thus, at first the first dielectric substance aggregation layer 303PA (the reference design wavelength $\lambda 1=420$ nm) reflects the S-polarized light in the short wavelength region with respect to both of the S-polarized light, in the short wavelength region, of the light LLS from the light source 101 and the S-polarized light, in the short wavelength region, of the light LLV from the light valves 307B, 307R, 307G. It is therefore possible to shorten the optical path along which the S-polarized light of the light in the short wavelength region travels without penetrating the second dielectric substance aggregation layer 303PB in the polarized light splitting element 103p. This configuration exhibits such an effect that there can be decreased both of the interaction between the S-polarized light having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Fourth Embodiment

Figure 11:
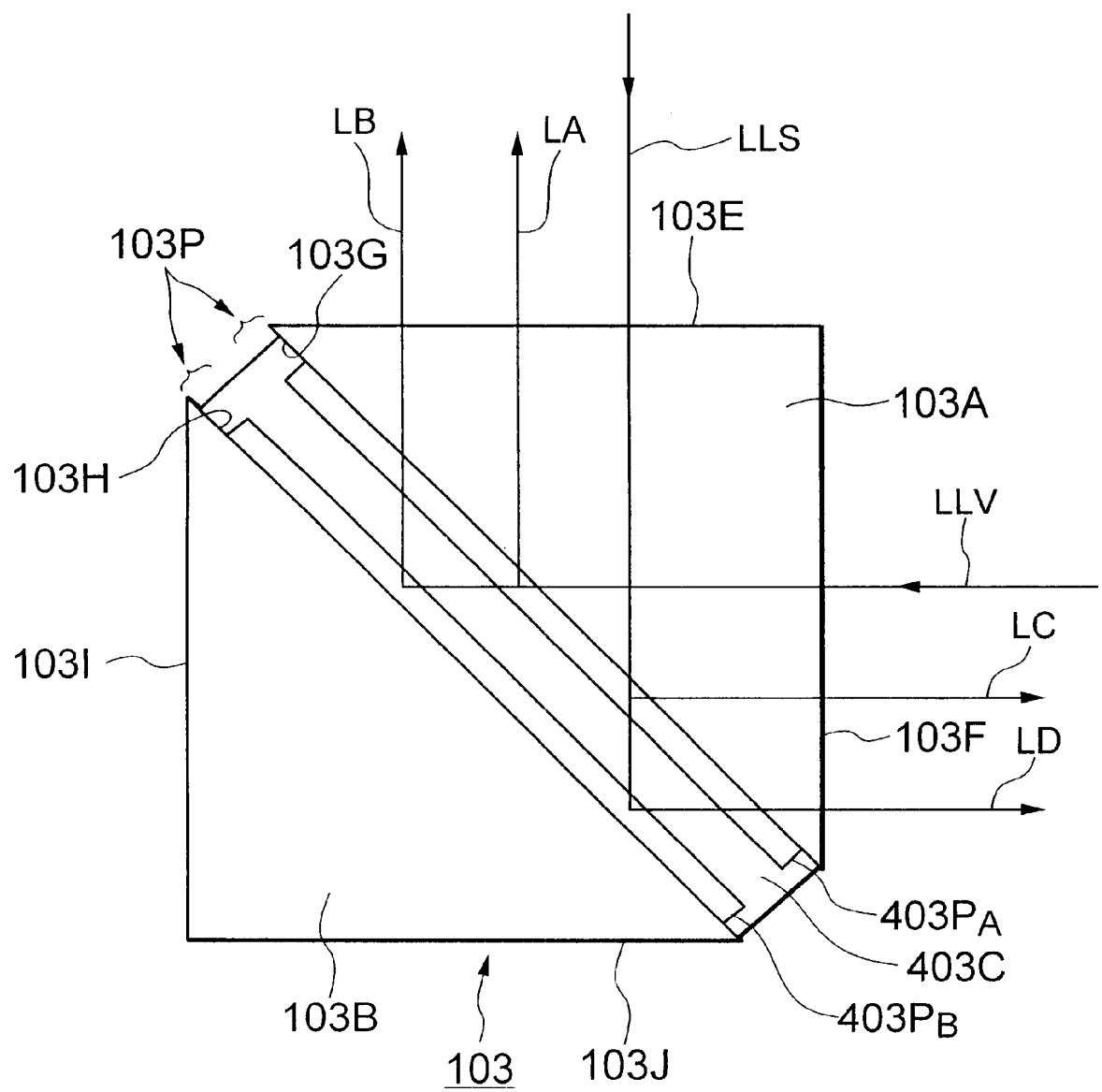
FIG. 11 is a schematic diagram showing a configuration of the polarization beam splitter in a fourth embodiment of the present invention.

The discussion in a fourth embodiment of the present invention will be focused on an example where the polarization beam splitter 103 shown in FIG. 11 is applied to the projection type display device in FIG. 8.

FIG. 11 is a diagram showing a sectional configuration of the polarization beam splitter in the fourth embodiment. A first dielectric substance aggregation layer 403PA is formed by the physical vapor deposition on the inclined surface 103G of the first rectangular prism 103A. A second dielectric substance aggregation layer 403PB is formed by the physical vapor deposition on the inclined surface 103H of the second rectangular prism 103B. The reference design wavelength λ1 of the first dielectric substance aggregation layer 403PA is 420 nm. The reference design wavelength λ2 of the second dielectric substance aggregation layer 403PB is 600 nm. Then, the first and second rectangular prisms 403A and 403B are bonded by an epoxy-series optical bonding agent layer 403C through the first and second dielectric substance aggregation layers 403PA, 403PB.

Further, the first dielectric substance aggregation layer 403PA is composed of the materials numbered 1 through 19 in FIG. 4. The second dielectric substance aggregation layer 403PB is composed of materials numbered 20 through 38 in FIG. 4. Other configurations are the same as those in the first embodiment. Hence, the same components are marked with the same reference symbols, and their repetitive explanations are herein omitted.

The reflectance characteristics of the polarization beam splitter in the fourth embodiment has the same characteristics (FIG. 5) described in the first embodiment. With this configuration, as in the third embodiment, at first the first dielectric substance aggregation layer 403PA (the reference design wavelength λ1=420 nm) reflects both of the S-polarized light, in the short wavelength region, of the light LLS from the light source 101 and the S-polarized light, in the short wavelength region, of the mixed light LLV from the light valves 307B, 307R, 307G. It is therefore possible to shorten the optical path along which the S-polarized light of the light in the short wavelength region travels through inside the polarized light splitting element 103p. This configuration exhibits such an effect that there can be decreased both of the interaction between the S-polarized light having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Fifth Embodiment

Figure 12:
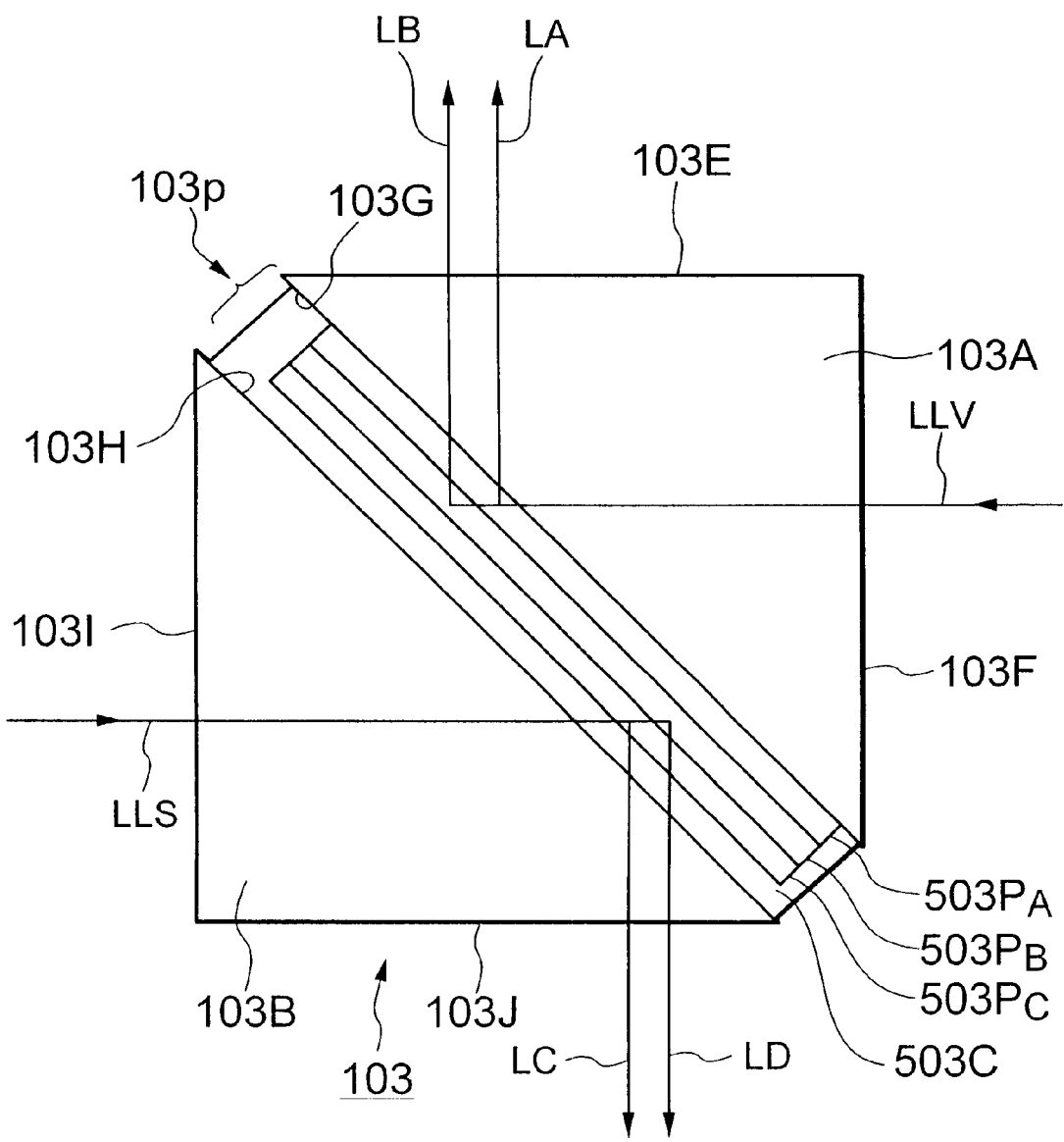
FIG. 12 is a schematic diagram showing a configuration of the polarization beam splitter in a fifth embodiment of the present invention.

The discussion in a fifth embodiment of the present invention will be focused on an example where the polarization beam splitter 103 shown in FIG. 12 is applied to the projection type display device in FIG. 1.

In the projection type display device in the first embodiment illustrated in FIG. 1, the polarized light converting unit 102 converts the LS light into the P-polarized light, and this P-polarized light enters the polarization beam splitter 103. The polarized light converting unit 102 has, as shown in FIG. 2, the polarization beam splitter array 1023 including the plurality of polarization beam splitter elements arranged in array. Herein, the direction of the light exiting an fly-eye integrator 1022 and entering the polarization beam splitter array 1023, is not limited to a fixed direction. Further, the plurality of polarized light splitting layers PD included in the polarization beam splitter array 1023 do not necessarily have the perfect polarized light splitting characteristic. Hence, in the polarized light converting unit 102 shown in FIG. 2, the exiting polarized light might contain about 10% through 20% of the light (S-polarized light) in other vibrating directions with respect to the P-polarized light.

In this case, the S-polarized light component, in the short wavelength region, of the light emitted from the light source travels through at first the second dielectric substance aggregation layer 103PB (the reference design wavelength λ2=600 nm). Next, the S-polarized light component, in the short wavelength region, of the light emitted from the light source enters the first dielectric substance aggregation layer 103PA (the reference design wavelength λ1=420 nm) and is then reflected. Accordingly, the S-polarized light in the short wavelength region is large of absorption due to the interaction with two dielectric substance aggregation layers 103PA, 103PB. Hence, as discussed above, the exothermic quantity based on the absorption increases. Then, when the exothermic quantity increases, the glass constituting the prism is distorted by a thermal stress, resulting in a disordered state of the polarized light of the polarization beam splitter. Moreover, if the configurations in the first and second embodiments do not involve the use of the polarized light converting unit 102, a half of the irradiation light from the light source is the S-polarized light, and hence this problem appears more conspicuously.

According to the fifth embodiment, if the polarized light converting unit 102 does not convert the light perfectly into the P-polarized light, or even if there is not provided the polarized light converting unit 102 but the random polarized light is incident, the exothermic problem due to the absorption can be prevented. FIG. 12 is a diagram showing a sectional configuration of the polarization beam splitter 103. A first dielectric substance aggregation layer 503PA reflecting the S-polarized light in a first wavelength region (the reference design wavelength λ1=420 nm) is formed by the physical vapor deposition on the predetermined surface 103G of the first rectangular prism 103A, and a second dielectric substance aggregation layer 503PB reflecting the S-polarized light in a second wavelength region (the reference design wavelength λ2=600 nm) longer than the first wavelength region, is so formed by the physical vapor deposition as to be stacked on the first dielectric substance aggregation layer 503PA. Further, a third dielectric substance aggregation layer 503PC reflecting the S-polarized light in a third wavelength region (the reference design wavelength λ1=420 nm) shorter than the second wavelength region (the reference design wavelength λ2=600 nm), is so formed by the physical vapor deposition as to be stacked on the second dielectric substance aggregation layer 503PB. Then, the second rectangular prism 103B is bonded (fixed) to the first rectangular prism 103A by an epoxy-series optical bonding agent layer 503C through the first, second and third dielectric substance aggregation layers 503PA, 503PB, 503PC. Note that the polarized light splitting element 103p described above is what the first, second and third dielectric substance aggregation layers 503PA, 503PB, 503PC are generically categorized.

FIG. 13 is a table showing a structure of the first, second and third dielectric substance aggregation layers 503PA, 503PB, 503PC. Serial numbers given at the left end in FIG. 13 indicate orders of the materials constituting the respective dielectric substance aggregation layers, which are counted from the side of the first rectangular prism 103A. The first dielectric substance aggregation layer 503PA is composed of the materials numbered 1 through 19, the second dielectric substance aggregation layer 503PB is composed of materials numbered 20 through 38, and the third dielectric substance aggregation layer 503PC is composed of materials numbered 39 through 57. The materials constituting the respective layers are the same as the materials (FIG. 4) used in the first embodiment, and hence the repetitive explanations are omitted.

Further, if the perfect S-polarized light enters the surface 103F of the polarization beam splitter 103, and if the perfect S-polarized light enters the surface 103I of the polarization beam splitter 103, the reflectance characteristics of the S-polarized light component reflected by the polarized light splitting element 103p are the same as those shown in FIG. 5. Thus, it can be understood that the polarization beam splitter 103 in the fifth embodiment has the preferable reflectance characteristic over the broad wavelength band with respect to both of the light LLS from the light source and the light LLV from the light valves.

Next, the polarized light splitting action in the fifth embodiment will be described referring to FIG. 12. To begin with, the light LLS from the light source 101 will be explained. The light LLS from the light source 101 (unillustrated)enters the surface 103I of the second rectangular prism 103B. Then, the light LLS travels straight through within the second rectangular prism 103B and exits the surface 103H. Next, the light LLS from the light source penetrates the bonding agent layer 503C and enters the third dielectric substance aggregation layer 503PC. The third dielectric substance aggregation layer 503PC reflects S-polarized light LC, in the short wavelength region, of the light LLS. The S-polarized light LC in the short wavelength region, which has been reflected by the third dielectric substance aggregation layer 503PC exits the surface 103J of the second rectangular prism 103B and is then discarded. Further, the third dielectric substance aggregation layer 503PC transmits the S-polarized light, in the long wavelength region, of the light LLS. Next, the second dielectric substance aggregation layer 503PB reflects S-polarized light LD, in the long wavelength region, of the light LLS. The S-polarized light LD reflected by the second dielectric substance aggregation layer 503PB exits the surface 103J of the second rectangular prism 103B and is discarded. Further, the P-polarized light in the long and short wavelength regions, of the light LLS travel through the first, second and third dielectric substance aggregation layer 503PA, 503PB 503PC and the bonding agent layer 503C as well. Next, the P-polarized light enters the surface 103G of the first rectangular prism 103A. Then, the P-polarized light travels straight through inside the first rectangular prism 103A, and exits the surface 103F toward the unillustrated prism 104.

Next, the mixed light LLV from the light valves 107B, 107R and 107G will be described. The mixed light LLV enters the surface 103F of the first rectangular prism 103A. The first dielectric substance aggregation layer 503PA reflects the modulated light (S-polarized light) LA, in the short wavelength region, of the light LLV. The modulated light (S-polarized light) LA reflected by the first dielectric substance aggregation layer 503PA exits the surface 103E of the first rectangular prism 103A. Further, the first dielectric substance aggregation layer 503PA transmits the modulated light (S-polarized light), in the long wavelength region, of the mixed light LLV. Next, the second dielectric substance aggregation layer 503PB reflects the modulated light (S-polarized light) LB, in the long wavelength region, of the mixed light LLV. The modulated light (S-polarized light) LB reflected by the second dielectric substance aggregation layer 503PB exits the surface 103E of the first rectangular prism 103A. The modulated light (S-polarized light) LA in the short wavelength region and the modulated light (S-polarized light) LB, which have exited the surface 103E of the first rectangular prism 103A, enter the projection lens (unillustrated). Then, these beams of modulated light (S-polarized light) projected as an image formed by the light valves 107B, 107R, 107G on the screen SC (not shown).

Further, the non-modulated light (P-polarized light), in the long and short wavelength regions, of the mixed light LLV pass through the first, second and third dielectric substance aggregation layers 503PA, 503PB, 503PC and the bonding agent layer 503C. Next, the non-modulated light (P-polarized light) enters the surface 103H of the second rectangular prism 103B. Then, the non-modulated light travels straight through inside the second rectangular prism 103B, then exits the surface 103I and is discarded.

Thus, at first the S-polarized light, in the short wavelength region, of the light LLV from the light valves 107B, 107R, 107G and the S-polarized light, in the short wavelength region, of the light LLS from the light source 101 is reflected by either the first or third dielectric substance aggregation layer 503PA or 503PC (the reference design wavelength $\lambda 1=420$ nm). It is therefore possible to shorten the optical path along which the S-polarized light of the light in the short wavelength region travels without penetrating the second dielectric substance aggregation layer 503PB in the polarized light splitting element 103p. This configuration exhibits such an effect that there can be decreased both of the interaction between the S-polarized light having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Sixth Embodiment

Figure 14:
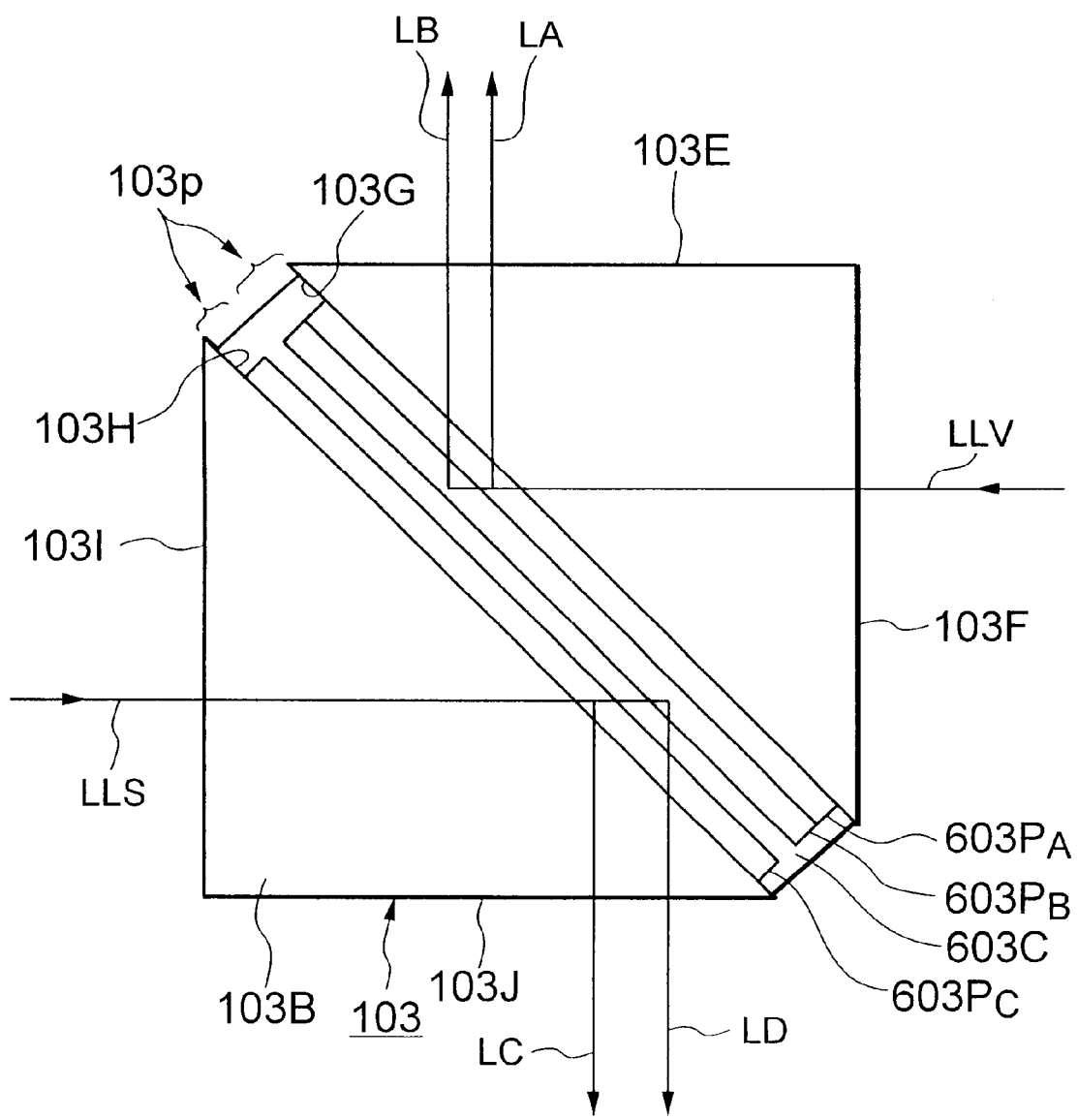
FIG. 14 is a schematic diagram showing a configuration of the polarization beam splitter in a sixth embodiment of the present invention.
Figure 15:
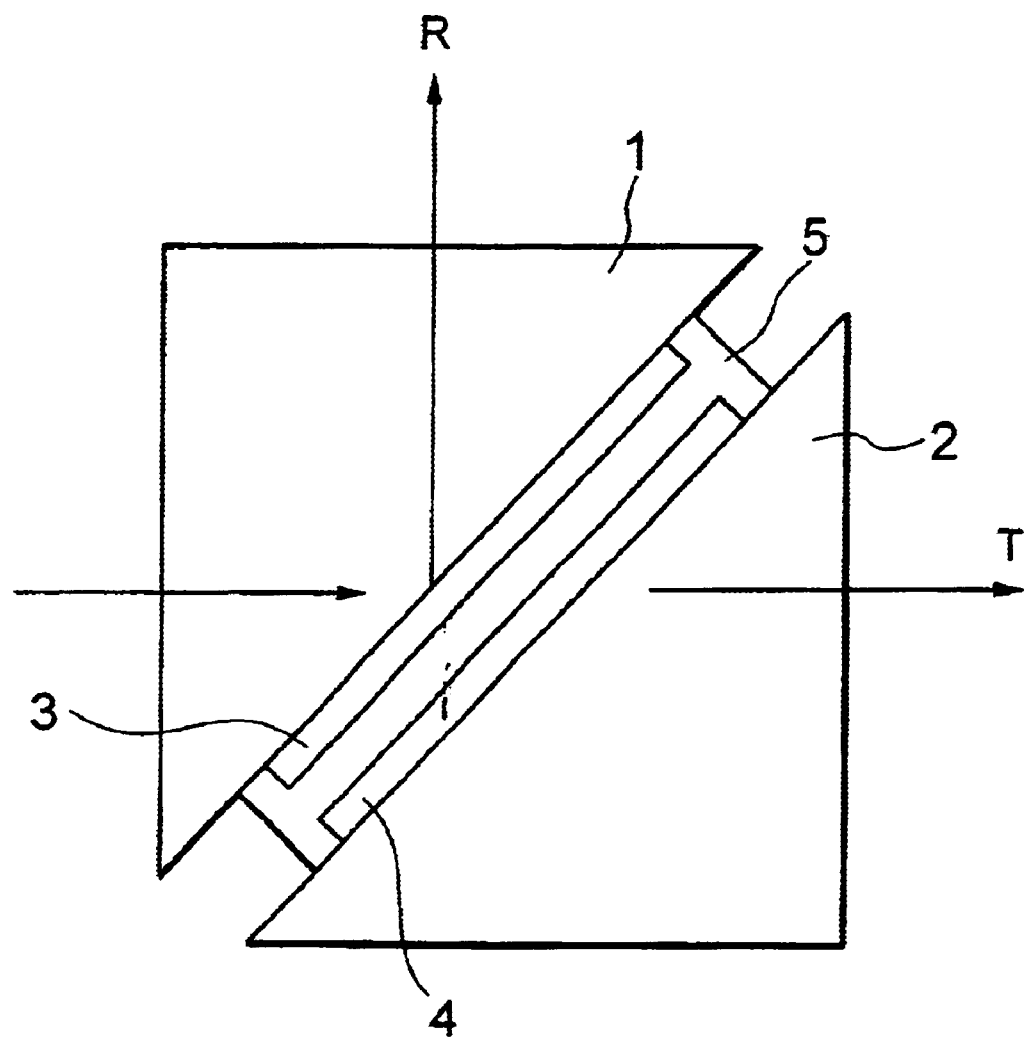
FIG. 15 is a schematic diagram showing a configuration of the conventional polarization beam splitter.

The discussion in a sixth embodiment of the present invention will be focused on an example where the polarization beam splitter shown in FIG. 14 is applied to the projection type display device in FIG. 1.

FIG. 14 is a diagram showing a sectional configuration of the polarization beam splitter in the sixth embodiment. A first dielectric substance aggregation layer 603PA reflecting the S-polarized light in the first wavelength region (the reference design wavelength $\lambda 1=420$ nm) is formed by the physical vapor deposition on the predetermined surface 103G of the first rectangular prism 103A, and a second dielectric substance aggregation layer 603PB reflecting the S-polarized light in the second wavelength region (the reference design wavelength $\lambda 2=600$ nm) longer than the first wavelength region, is so formed by the physical vapor deposition as to be stacked on the first dielectric substance aggregation layer 603PA. This configuration is the same as that in the fifth embodiment discussed above. Then, a third dielectric substance aggregation layer 603PC reflecting the S-polarized light in a third wavelength region (the reference design wavelength $\lambda 1=420$ nm) shorter than the second wavelength region$\lambda 1$, is formed by the physical vapor deposition on the surface 103H of the second rectangular prism 103B, which is different from the fifth embodiment. The second rectangular prism 103B is bonded (fixed) to the first rectangular prism 103A by an epoxy-series optical bonding agent layer 603C through the first, second and third dielectric substance aggregation layers 603PA, 603PB, 603PC. Note that the polarized light splitting element 103p described above is what the first, second and third dielectric substance aggregation layers 603PA, 603PB, 603PC are generically categorized.

The layer structures and the reflectance characteristics thereof in the sixth embodiment are the same as those in the fifth embodiment. According to the sixth embodiment, as in the fifth embodiment, the light LLS from the light source 101 is at first reflected by the third dielectric substance aggregation layer 603PC (the reference design wavelength λ1=420 nm). Further, the mixed light LLV from the light valves 107B, 107R, 107G is at first reflected by the first dielectric substance aggregation layer 603PA (the reference design wavelength λ1=420 nm). It is therefore feasible to shorten the optical path along which the S-polarized light of the light in the short wavelength region travels without penetrating the second dielectric substance aggregation layer 603PB in the polarized light splitting element 103p. This configuration exhibits such an effect that there can be decreased both of the interaction between the S-polarized light having the short wavelength and the dielectric substance aggregation layer and an exothermic quantity based on the absorption. Hence, the polarization beam splitter having a high polarized light splitting ratio and a broad bandwidth of the wavelength to be used, can be obtained. Further, an optical device for the projection type display device provided with this beam splitter and the projection type display device are capable of obtaining a high-contrast projected image with a less distortion.

Seventh Embodiment

A method of manufacturing the polarization beam splitter in each of the embodiments described above will be described referring to FIG. 3 by way of an example.

To start with, in a first aggregation layer forming step, the first dielectric substance aggregation layer 103PA reflecting the S-polarized light in the first wavelength region (the reference design wavelength λ1=420 nm) is formed by the physical vapor deposition on the surface 103G of the first rectangular prism 103A. In a second aggregation layer forming step, the second dielectric substance aggregation layer 103PB reflecting the S-polarized light in the second wavelength region (the reference design wavelength λ2=600 nm) longer than the first wavelength region, is so formed by the physical vapor deposition as to be stacked on the first dielectric substance aggregation layer 103PA. Then, in a fixing step, the second rectangular prism 103B is bonded (fixed) by the epoxy-series optical bonding agent through the first and second dielectric substance aggregation layers 103PA, 103PB to the first rectangular prism 103A formed with the first and second dielectric substance aggregation layers 103PA, 103PB.

Further, in the case of manufacturing the polarization beam splitter having the configuration shown in FIG. 12 in the fifth embodiment, further in a third aggregation layer forming step subsequent to the second aggregation layer forming step, the third dielectric substance aggregation layer 503PC reflecting the S-polarized light in the third wavelength region (the reference design wavelength λ1=420 nm) shorter than the second wavelength region (the reference design wavelength λ2=600 nm) is so formed by the physical vapor deposition as to be stacked on the second dielectric substance aggregation layer 503PB. Then, in the fixing step, the second rectangular prism 103B is bonded (fixed) by the epoxy-series optical bonding agent to the first rectangular prism 103A through the first, second and third dielectric substance aggregation layers 503PA, 503PB, 503PC.

Moreover, in the case of manufacturing the polarization beam splitter having the configuration shown in FIG. 14 in the sixth embodiment, further in the third aggregation layer forming step subsequent to the second aggregation layer forming step, the third dielectric substance aggregation layer 603PC reflecting the S-polarized light in the third wavelength region (the reference design wavelength λ1=420 nm) shorter than the second wavelength region (the reference design wavelength λ2=600 nm) is formed by the physical vapor deposition on the second rectangular prism 103B. Then, in the fixing step, the first and second rectangular prisms 103A, 103B are bonded (fixed) through the first, second and third dielectric substance aggregation layers 603PA, 603PB, 603PC.

According to these steps, there is yielded such an effect that the polarization beam splitter having a high polarized light splitting ratio and a broad bandwidth of the wavelength to be used, can be obtained.

Moreover, as discussed above, in accordance with each of the embodiments, the first, second and third dielectric substance aggregation layers are formed by the physical vapor deposition on the prisms. The physical vapor deposition includes a vacuum vapor deposition, sputtering, ion plating and so on.

Further, in each of the embodiments discussed above, the first and second rectangular prisms 103A, 103B are fixedly bonded to each other by the epoxy-series bonding agent. The bonding agent is not, however, limited to this and may also involve the use of an ultraviolet ray hardening type bonding agent or a visible light hardening type bonding agent. In the case of using the ultraviolet ray hardening type bonding agent, after this bonding agent has been coated as the bonding agent layer 103PC, the two prisms 103A, 103B are bonded. Then, the bonding agent layer 103PC is irradiated with the ultraviolet rays and thereby hardened. Further, in the case of using the visible light hardening type bonding agent, after this bonding agent has been coated as the bonding agent layer 103PC, the two prisms 103A, 103B are bonded. Then, the bonding agent layer 103PC is irradiated with the visible light and thereby hardened.

In addition, in accordance with, e.g., the first embodiment, the first and second rectangular prisms 103A, 103B may be fixed in an optical contact state where the air between the second dielectric substance aggregation layer 103PB and the second rectangular prism 103B is evacuated. This method may be similarly applied to the second through seventh embodiments.

It is to be noted that the present invention is not limited to the embodiments discussed above and can take, as a matter of course, a variety of configurations without departing from the concept of the present invention in the range of the present invention.

As discussed above, according to the present invention, it is possible to provide the polarization beam splitter having a high polarized light splitting ratio and a broad bandwidth of the wavelength to be used, the manufacturing method thereof, the optical device for the image projection type display device capable of obtaining a high-contrast projected image with a less distortion, and also the projection type display device.

What is claimed is:

1. A polarization beam splitter comprising:
    a first prism having a first aggregation layer formed on a predetermined surface of said first prism and reflecting S-polarized light in a first wavelength region, and a second aggregation layer so formed as to be stacked on said first aggregation layer and reflecting the S-polarized light in a second wavelength region longer than the first wavelength region; and
    a second prism fixed to said first prism through said first aggregation layer and said second aggregation layer.

2. A polarization beam splitter according to claim 1, further comprising a third aggregation layer so formed as to be stacked on said second aggregation layer and reflecting the S-polarized light in a third wavelength region shorter than the second wavelength region.

3. A polarization beam splitter according to claim 1, further comprising a third aggregation layer formed on a predetermined surface of said second prism and reflecting the S-polarized light in a third wavelength region shorter than the second wavelength region, said second prism being fixed to said first prism through said first, second and third aggregation layers.

4. A polarization beam splitter according to claim 1, wherein said first and second aggregation layers are formed by vapor deposition on said first prism.

5. A polarization beam splitter according to claim 2, wherein said third aggregation layer is formed by the vapor deposition on said first prism.

6. A polarization beam splitter according to claim 3, wherein said third aggregation layer is formed by the vapor deposition on said second prism.

7. An optical device for a projection type display device, comprising:

a polarized light splitting optical system for polarization-splitting the light emitted from a light source and letting the split light exit; and an analyzing optical system for letting light emitted from light valves for modulating incident light in accordance with an image signal enter its incidence surface, analyzing the same light and letting the light exit its exit surface, wherein said analyzing optical system includes a first aggregation layer reflecting S-polarized light in a first wavelength region and a second aggregation layer reflecting the S-polarized light in a second wavelength region longer than said first wavelength region between transparent optical members, and said first aggregation layer is provided closer to an incidence surface of said analyzing optical system than said second aggregation layer.

8. An optical device for a projection type display device according to claim 7, wherein said polarized light splitting optical system is a polarized light splitting/color separating optical system for polarization splitting and color-separating the light emitted from said light source, said light valves are a plurality of light valves each disposed for every color light exiting said polarized light splitting/color separating optical system, and serving to modulate the incident light in accordance with each color image signal, said analyzing optical system is a color synthesizing/analyzing optical system for color-synthesizing and detecting the light emitted from said plurality of light valves, and said color synthesizing/analyzing optical system is configured such that said first aggregation layer is disposed closer to all of said light valves than said second aggregation layer.

9. An optical device for a projection type display device according to claim 8, wherein said color synthesizing/analyzing optical system is an optical system for color-synthesizing the light and thereafter analyzing the light.

10. An optical device for a projection type display device according to claim 7, wherein one polarization beam splitter functioning as said polarized light splitting optical system and as said analyzing optical system is provided, a polarized light converting unit for converting the light from said light source into P-polarized light is provided between said polarization beam splitter and said light source, and said polarization beam splitter transmits the P-polarized light exiting said polarized light converting unit and lets the P-polarized light exit towards said light valves.

11. An optical device for a projection type display device according to claim 7, wherein one polarization beam splitter functioning as said polarized light splitting optical system and as said analyzing optical system is provided, and said polarization beam splitter reflects the S-polarized light from said light source and lets the S-polarized light exit towards said light valves.

12. An optical device for a projection type display device according to claim 7, wherein one polarization beam splitter functioning as said polarized light splitting optical system and as said analyzing optical system is provided, said polarization beam splitter reflects the P-polarized light from said light source and lets the P-polarized light exit towards said light valves, and said analyzing optical system contains said first aggregation layer, said second aggregation layer and a third aggregation layer disposed in a position opposite to said first aggregation layer via said second aggregation layer, and reflecting the light in a third wavelength region shorter than the second wavelength region.

13. An optical device for a projection type display device, comprising:

a polarized light splitting optical system for polarization-splitting the light emitted from a light source and letting the split light exit; and an analyzing optical system for analyzing light emitted from light valves for modulating incident light in accordance with an image signal, wherein one polarization beam splitter functioning as said polarized light splitting optical system and as said analyzing optical system is provided, said polarization beam splitter contains a reflection layer reflecting S-polarized light in a first wavelength region, and a reflection layer reflecting the S-polarized light in a second wavelength region longer than the first wavelength region, and the light from said light source and the light from said light valves are incident at first upon the reflection layer reflecting the S-polarized light in the first wavelength region.

14. An optical device for a projection type display device according to claim 7, wherein said first and second aggregation layers are formed by vapor deposition on said analyzing optical system.

15. An optical device for a projection type display device according to claim 12, wherein said third aggregation layer is formed by the vapor deposition on said analyzing optical system.

16. An optical device for a projection type display device according to claim 13, wherein said reflection layer is formed by the vapor deposition on said polarization beam splitter.

17. A projection type display device comprising:

a light source for supplying irradiation light;

a polarized light splitting optical system for polarization-splitting the irradiation light from said light source and letting the split light exit;

light valves for modulating the incident light in accordance with image signals;

an analyzing optical system for making the exit light from said light valves incident upon its incidence surface, analyzing the incident light and letting the light exit its exit surface; and a projection optical system, disposed on the side of the exit surface of said analyzing optical system, for projecting an image from said light valves, wherein said analyzing optical system includes a first aggregation layer reflecting S-polarized light in a first wavelength region and a second aggregation layer reflecting the S-polarized light in a second wavelength region longer than said first wavelength region between transparent optical members, and said first aggregation layer is provided closer to an incidence surface of said analyzing optical system than said second aggregation layer.

18. A projection type display device according to claim 17, wherein said polarized light splitting optical system is a polarized light splitting/color separating optical system for polarization splitting and color-separating the light emitted from said light source, said light valves are a plurality of light valves each disposed for every color light exiting said polarized light splitting/color separating optical system, and serving to modulate the incident light in accordance with each color image signal, said analyzing optical system is a color synthesizing/analyzing optical system for color-synthesizing and analyzing the light emitted from said plurality of light valves, and said color synthesizing/analyzing system is configured such that said first aggregation layer is disposed closer to all of said light valves than said second aggregation layer.

19. A projection type display device according to claim 18, wherein said color synthesizing/analyzing optical system is an optical system for color-synthesizing the light and thereafter analyzing the light.

20. A projection type display device according to claim 17, wherein one polarization beam splitter functioning as said polarized light splitting optical system and as said analyzing optical system is provided, a polarized light converting unit for converting the light from said light source into P-polarized light is provided between said polarization beam splitter and said light source, and said polarization beam splitter transmits the P-polarized light exiting said polarized light converting unit and lets the P-polarized light exit towards said light valves.

21. A projection type display device according to claim 17, wherein one polarization beam splitter functioning as said polarized light splitting optical system and as said analyzing optical system is provided, and said polarization beam splitter reflects the S-polarized light from said light source and lets the S-polarized light exit towards said light valves.

22. A projection type display device according to claim 17, wherein one polarization beam splitter functioning as said polarized light splitting optical system and as said analyzing optical system is provided, said polarization beam splitter reflects the P-polarized light from said light source and lets the P-polarized light exit towards said light valves, and said analyzing optical system contains said first aggregation layer, said second aggregation layer and a third aggregation layer disposed in a position opposite to said first aggregation layer via said second aggregation layer, and reflecting the light in a third wavelength region shorter than the second wavelength region.

23. A projection type display device comprising:
a light source for supplying irradiation light;
a polarized light splitting optical system for polarization-splitting the irradiation light from said light source and letting the split light exit;
light valves for modulating the incident light in accordance with image signals;
an analyzing optical system for detecting the exit light from said light valves;
a projection optical system, disposed on the exit side of said analyzing optical system, for projecting an image from said light valves,
wherein one polarization beam splitter functioning as said polarized light splitting optical system and as said analyzing optical system is provided,
said polarization beam splitter contains a reflection layer reflecting S-polarized light in a first wavelength region, and a reflection layer reflecting the S-polarized light in a second wavelength region longer than the first wavelength region, and
the light from said light source and the light from said light valves are incident at first upon the reflection layer reflecting the S-polarized light in the first wavelength region.

24. A projection type display device according to claim 17, wherein said first and second aggregation layers are formed by vapor deposition on said analyzing optical system.

25. A projection type display device according to claim 22, wherein said third aggregation layer is formed by the vapor deposition on said analyzing optical system.

26. A projection type display device according to claim 23, wherein said reflection layer is formed by the vapor deposition on said polarization beam splitter.

27. A polarization beam splitter manufacturing method comprising:
a first aggregation layer forming step of forming, on a first prism, a first aggregation layer reflecting S-polarized light in a first wavelength region;
a second aggregation layer forming step of forming a second aggregation layer reflecting the S-polarized light in a second wavelength region longer than the first wavelength region so as to be stacked on said first aggregation layer; and
a fixing step of fixing a second prism to said first prism formed with said first and second aggregation layers through said first and second aggregation layers.

28. A polarization beam splitter manufacturing method according to claim 27, further comprising a third aggregation layer forming step of forming a third aggregation layer reflecting the S-polarized light in a third wavelength region shorter than the second wavelength region so as to be stacked on said second aggregation layer.

29. A polarization beam splitter manufacturing method according to claim 27, further comprising a third aggregation layer forming step of forming, on said second prism, a third aggregation layer reflecting the S-polarized light in a third wavelength region shorter than the second wavelength region,
said fixing step involves fixing said second prism to said first prism through said first, second and third aggregation layers.

* * * * *